US010078767B2

(12) United States Patent
Tsirline et al.

(10) Patent No.: US 10,078,767 B2
(45) Date of Patent: Sep. 18, 2018

(54) SYSTEMS, METHODS AND ASSOCIATED RFID ANTENNAS FOR PROCESSING A PLURALITY OF TRANSPONDERS

(71) Applicant: ZIH Corp., Lincolnshire, IL (US)

(72) Inventors: Boris Y. Tsirline, Glenview, IL (US); Karl Torchalski, Arlington Heights, IL (US)

(73) Assignee: ZIH Corp., Lincolnshire, IL (US)

( * ) Notice: Subject to any disclaimer, the term of this patent is extended or adjusted under 35 U.S.C. 154(b) by 317 days.

(21) Appl. No.: 13/848,670

(22) Filed: Mar. 21, 2013

(65) Prior Publication Data

US 2013/0193209 A1 Aug. 1, 2013

Related U.S. Application Data

(62) Division of application No. 11/941,782, filed on Nov. 16, 2007.

(Continued)

(51) Int. Cl.
| | |
|---|---|
| G06K 7/10 | (2006.01) |
| G06K 19/07 | (2006.01) |
| G06K 7/08 | (2006.01) |
| H01Q 1/22 | (2006.01) |
| H01Q 1/52 | (2006.01) |

(Continued)

(52) U.S. Cl.
CPC ......... G06K 7/086 (2013.01); G06K 7/10009 (2013.01); H01Q 1/2208 (2013.01); H01Q 1/526 (2013.01); H01Q 7/00 (2013.01); G06K 7/0008 (2013.01); G06K 19/045 (2013.01); G06K 19/0723 (2013.01);

(Continued)

(58) Field of Classification Search
CPC combination set(s) only.
See application file for complete search history.

(56) References Cited

U.S. PATENT DOCUMENTS

| | | |
|---|---|---|
| 2,812,501 A | 11/1957 | Sommers |
| 5,192,954 A | 3/1993 | Brockelsby et al. |

(Continued)

FOREIGN PATENT DOCUMENTS

| | | | |
|---|---|---|---|
| EP | 1265186 A2 * | 12/2002 | ........... G06K 7/0004 |
| FR | 2 822 594 | 9/2002 | |

OTHER PUBLICATIONS

Balanis, "Chapter 2—Fundamental Parameters of Antennas: Paragraph 2.2.4—Field Regions," *Antenna Theory: Analysis and Design*; Third Edition; John Wiley & Sons, Inc., pp. 34-36, (2005).

(Continued)

*Primary Examiner* — Daniel Walsh

(57) ABSTRACT

An RFID system for selectively communicating with a targeted transponder from among a group of multiple adjacent transponders is provided. The RFID system may include a transponder conveyance system adapted to transport at least one targeted transponder from a group of multiple adjacent transponders through a transponder encoding area along a feeding direction and an antenna having a resonant inductor and a ferrite material, wherein the ferrite material at least partially covers the resonant inductor and defines an exposed portion of the resonant inductor. In one antenna-transponder alignment, the exposed portion extends substantially parallel to the feeding direction.

17 Claims, 14 Drawing Sheets

Related U.S. Application Data

(60) Provisional application No. 60/866,090, filed on Nov. 16, 2006.

(51) Int. Cl.
*H01Q 7/00* (2006.01)
*G06K 19/077* (2006.01)
*G06K 19/04* (2006.01)
*G06K 7/00* (2006.01)

(52) U.S. Cl.
CPC . *G06K 19/07716* (2013.01); *G06K 19/07718* (2013.01); *G06K 19/07773* (2013.01)

(56) References Cited

U.S. PATENT DOCUMENTS

| | | | | |
|---|---|---|---|---|
| 6,164,532 | A * | 12/2000 | Suga | G06K 7/0008 |
| | | | | 235/375 |
| 6,246,326 | B1 * | 6/2001 | Wiklof | G06K 19/077 |
| | | | | 340/572.1 |
| 6,320,169 | B1 * | 11/2001 | Clothier | G06K 7/0008 |
| | | | | 219/620 |
| 6,327,972 | B2 * | 12/2001 | Heredia | G06K 1/121 |
| | | | | 101/35 |
| 6,386,772 | B1 * | 5/2002 | Klinefelter | B41J 2/17546 |
| | | | | 235/380 |
| 6,588,670 | B2 * | 7/2003 | Bukowski | 235/462.45 |
| 6,848,616 | B2 * | 2/2005 | Tsirline | G06K 7/0008 |
| | | | | 235/432 |
| 6,899,476 | B1 * | 5/2005 | Barrus | B41J 3/4075 |
| | | | | 101/35 |
| 7,398,926 | B1 * | 7/2008 | Kikin | H04B 5/0062 |
| | | | | 235/382.5 |
| 7,623,038 | B2 | 11/2009 | Neuhard | |
| 7,969,283 | B2 * | 6/2011 | Ohashi | G06K 7/0008 |
| | | | | 340/10.3 |
| 8,152,392 | B2 * | 4/2012 | Tanaka | G06K 17/0025 |
| | | | | 400/613 |
| 8,436,733 | B2 * | 5/2013 | Ichikawa | G06K 17/0025 |
| | | | | 340/10.1 |
| 8,493,215 | B2 * | 7/2013 | Tada | G06K 19/07749 |
| | | | | 340/572.7 |
| 9,852,316 | B2 * | 12/2017 | Garcia | G06K 7/01 |
| 2001/0013830 | A1 * | 8/2001 | Garber | G06K 7/10079 |
| | | | | 340/572.4 |
| 2001/0029857 | A1 * | 10/2001 | Heredia | G06K 1/121 |
| | | | | 101/288 |
| 2002/0030597 | A1 * | 3/2002 | Muirhead | B29C 51/02 |
| | | | | 340/572.1 |
| 2003/0063001 | A1 * | 4/2003 | Hohberger | B41J 3/4075 |
| | | | | 340/572.1 |
| 2003/0193445 | A1 * | 10/2003 | Mejia | H01Q 1/22 |
| | | | | 343/867 |
| 2004/0082918 | A1 * | 4/2004 | Evans et al. | 604/207 |
| 2004/0100413 | A1 * | 5/2004 | Waldner | G06K 7/10336 |
| | | | | 343/742 |
| 2004/0178267 | A1 * | 9/2004 | Tsirline et al. | 235/449 |
| 2005/0029350 | A1 * | 2/2005 | Jusas | G06K 5/02 |
| | | | | 235/451 |
| 2005/0045723 | A1 * | 3/2005 | Tsirline | G06K 1/12 |
| | | | | 235/451 |
| 2005/0045724 | A1 | 3/2005 | Tsirline et al. | |
| 2005/0058483 | A1 * | 3/2005 | Chapman | B41J 3/4075 |
| | | | | 400/76 |
| 2005/0092838 | A1 * | 5/2005 | Tsirline et al. | 235/449 |
| 2005/0150102 | A1 * | 7/2005 | Bosco | G06K 7/0095 |
| | | | | 29/593 |
| 2005/0206524 | A1 * | 9/2005 | Forster | G06K 7/0095 |
| | | | | 340/572.8 |
| 2005/0274799 | A1 * | 12/2005 | Torchalski | B41J 3/4075 |
| | | | | 235/432 |
| 2005/0280537 | A1 * | 12/2005 | Feltz | G06K 1/121 |
| | | | | 340/572.1 |
| 2006/0019135 | A1 * | 1/2006 | Curello | H01M 8/04201 |
| | | | | 429/443 |
| 2006/0038686 | A1 * | 2/2006 | Casden | G06K 7/10336 |
| | | | | 340/572.7 |
| 2006/0071796 | A1 * | 4/2006 | Korzeniewski | G06K 19/07716 |
| | | | | 340/572.8 |
| 2006/0109496 | A1 * | 5/2006 | Brown | G06K 7/0008 |
| | | | | 358/1.15 |
| 2006/0145870 | A1 | 7/2006 | Coveley et al. | |
| 2006/0213994 | A1 * | 9/2006 | Faiz et al. | 235/462.05 |
| 2006/0220859 | A1 * | 10/2006 | Nagai | B41J 3/50 |
| | | | | 340/572.1 |
| 2006/0222430 | A1 * | 10/2006 | Duckett | B41J 3/4075 |
| | | | | 400/583 |
| 2006/0244603 | A1 * | 11/2006 | Kline | G06K 19/07718 |
| | | | | 340/572.7 |
| 2006/0250253 | A1 | 11/2006 | Liu | |
| 2006/0255945 | A1 * | 11/2006 | Egbert | G06K 19/07771 |
| | | | | 340/572.7 |
| 2006/0290493 | A1 | 12/2006 | Taki | |
| 2007/0013541 | A1 * | 1/2007 | Harazin | G01N 35/00732 |
| | | | | 340/8.1 |
| 2007/0023516 | A1 | 2/2007 | Chapman et al. | |
| 2007/0063843 | A1 * | 3/2007 | Tsirline | G06K 7/0008 |
| | | | | 340/572.1 |
| 2007/0084548 | A1 * | 4/2007 | Tanaka | B41J 3/4075 |
| | | | | 156/238 |
| 2007/0120670 | A1 * | 5/2007 | Torchalski | G06K 17/00 |
| | | | | 340/572.1 |
| 2007/0138281 | A1 * | 6/2007 | Moriyama | B41J 3/4075 |
| | | | | 235/451 |
| 2007/0139161 | A1 | 6/2007 | Mori | |
| 2007/0145134 | A1 | 6/2007 | Ichikawa | |
| 2007/0146135 | A1 * | 6/2007 | Boyadjieff | G06K 7/0095 |
| | | | | 340/572.1 |
| 2007/0171071 | A1 * | 7/2007 | Chiu | H01Q 1/2208 |
| | | | | 340/572.7 |
| 2007/0200710 | A1 * | 8/2007 | Feltz et al. | 340/572.7 |
| 2007/0268143 | A1 * | 11/2007 | Copeland | H01Q 1/22 |
| | | | | 340/572.7 |
| 2008/0047660 | A1 * | 2/2008 | Angel | B65C 9/1869 |
| | | | | 156/238 |
| 2008/0117027 | A1 * | 5/2008 | Tsirline | H01Q 1/2208 |
| | | | | 340/10.6 |
| 2008/0117059 | A1 * | 5/2008 | Ohashi et al. | 340/572.8 |
| 2008/0150720 | A1 | 6/2008 | Feltz et al. | |
| 2008/0186186 | A1 | 8/2008 | Campbell | |
| 2008/0232883 | A1 * | 9/2008 | Klein | G06K 7/10079 |
| | | | | 400/76 |
| 2008/0258876 | A1 | 10/2008 | Overhultz et al. | |
| 2008/0303722 | A1 | 12/2008 | Feltz et al. | |
| 2009/0015480 | A1 * | 1/2009 | Shafer | G06K 19/07749 |
| | | | | 343/700 MS |
| 2009/0045964 | A1 * | 2/2009 | Takeda | G06K 19/07749 |
| | | | | 340/572.9 |
| 2009/0160613 | A1 * | 6/2009 | Hirota | G06K 17/00 |
| | | | | 340/10.1 |
| 2009/0189770 | A1 * | 7/2009 | Wirrig | G06K 1/121 |
| | | | | 340/572.8 |
| 2009/0295542 | A1 * | 12/2009 | Hioki | B31D 1/021 |
| | | | | 340/10.1 |
| 2010/0024669 | A1 * | 2/2010 | Feltz | G06K 1/121 |
| | | | | 101/212 |
| 2010/0045437 | A1 * | 2/2010 | Hioki | B32B 37/226 |
| | | | | 340/10.1 |
| 2010/0164726 | A1 * | 7/2010 | Tada | G06K 19/07749 |
| | | | | 340/572.7 |
| 2010/0328702 | A1 * | 12/2010 | Eberhardt, Jr. | G06K 17/0025 |
| | | | | 358/1.15 |
| 2012/0019363 | A1 | 1/2012 | Fein | |
| 2012/0025986 | A1 * | 2/2012 | Hino | H01Q 1/2225 |
| | | | | 340/572.1 |
| 2012/0080527 | A1 * | 4/2012 | Finn | G06K 19/07722 |
| | | | | 235/492 |

(56) References Cited

U.S. PATENT DOCUMENTS

2013/0134225 A1* 5/2013 Teshima .............. G06K 19/0723
235/492
2013/0141222 A1* 6/2013 Garcia ..................... G06K 7/01
340/10.51
2013/0206846 A1* 8/2013 Wilkinson ......... G06K 7/10178
235/492

OTHER PUBLICATIONS

Pozar, "Paragraph 2.5—The Quarter-Wave Transformer," *Microwave Engineering*; Third Edition; John Wiley & Sons, Inc., pp. 73-76, (2005).

Qing et al., "2.45 GHZ Circularly Polarized RFID Reader Antenna," *IEEE*; pp. 612-615, XP10743394, (2004).

Schmitt, "Understanding electromagnetic fields and antenna radiation takes (almost) no math," *EDN*; pp. 77-88; (2000). Available at <http://www.ednmag.com>.

Simmons et al., "Chapter 3: Introduction to Transmission Lines and Waveguides,", *Navel Education and Training Professional Development and Technology Center*, US Navy, Electronic Technician; vol. 7—Antennas and Wave Propagation, pp. 3-1 to 3-32, (1995).

Tsirline, "Spatially Selective Antenna for Very Close Proximity HF RFID Applications-Part 1," *High Frequency Electronics*; Summit Technical Media LLC, 7 pages, (2007).

Tsirline, "Spatially Selective Antenna for Very Close Proximity HF RFID Applications-Part 2," *High Frequency Electronics*; Summit Technical Media LLC, 11 pages, (2007).

\* cited by examiner

SYSTEMS, METHODS AND ASSOCIATED RFID ANTENNAS FOR PROCESSING A PLURALITY OF TRANSPONDERS

CROSS-REFERENCE TO RELATED APPLICATIONS

The present application is a divisional and claims the benefit of U.S. patent application Ser. No. 11/941,782, filed on Nov. 16, 2007, which was a non-provisional of U.S. Provisional Application No. 60/866,090, filed on Nov. 16, 2006, both of which are hereby incorporated by reference in their entireties.

BACKGROUND

Magnetically coupled radio frequency identification ("RFID") technology allows data acquisition or transmission from and to active (e.g., battery-powered, -assisted, or -supported) or passive RFID transponders using RF magnetic induction. To read or write to a transponder or a memory element of a transponder, the transponder is exposed to an RF magnetic field that couples with and may energize the RFID transponder through magnetic induction and transfers commands and data from a reader using a predefined "air interface" RF signaling protocol.

When multiple transponders are within the range of the same RF magnetic field they may each be energized and attempt to communicate with the transceiver, potentially causing errors in reading or writing to a specific transponder, often referred to as collision errors. Anti-collision management technologies exist to allow near simultaneous reading and writing to numerous transponders in a common RF magnetic field. However, anti-collision management increases system complexity, interrogation time, and cost. Furthermore, anti-collision management is blind, i.e., it cannot determine what transponder or transponders are responding out of a plurality of transponders near the antenna of the reader.

One way to prevent errors during reading and writing to particular transponder without using anti-collision management is to isolate that transponder from the nearby or adjacent transponders. For example, devices or systems may employ an RF-shielded housing or anechoic chamber for shielding a targeted transponder from the other transponders. The transponders are individually passed though the shielded housing or chamber for individualized exposure to an interrogating RF magnetic field. Unfortunately, RF-shielded housings add cost and complexity to a system. Furthermore, many systems are limited with regard to space or weight and, thus, cannot accommodate such shielded housings.

When transponders are supplied attached to a carrier substrate, e.g., RFID-mounted labels, tickets, tags or other media supplied in bulk rolls, Z-folded stacks or other format, an extra portion of the carrier substrate is required to allow one transponder on the carrier substrate to exit the shielded field area before the next transponder in line enters it. The extra carrier substrate increases materials costs and the required volume of the RFID media bulk supply for a given number of transponders. Also, the increased spacing between transponders may also slow overall throughput of the system.

When the size or form factor of the utilized transponder is changed, the RF shielding and or anechoic chamber configuration may also require reconfiguration, adding cost and complexity and reducing overall productivity.

There are applications in which it is desired to print on transponder-mounting media in the same target space in which the transponder is being read from or written to (e.g., printer-encoders). This may be difficult to accomplish if the transponder must be interrogated in a shielded housing or chamber.

Printer-encoders have been developed which are capable of on-demand printing on labels, tickets, tags, cards or other media that include a transponder (often referred to as "smart media"). These printer-encoders have an RFID transceiver for on-demand communicating with the transponder of the individual media. For the reasons given, it may be desirable in some applications to present the smart media on rolls or other formats in which the transponders are closely spaced. However, as explained above, the close space between the transponders may exacerbate the task of serially communicating with each individual transponder without concurrently communicating with transponders on neighboring media. The selective communication of an individual transponder among a plurality of closely spaced transponders may be further exacerbated in printer-encoders (or other conveyor systems) configured to print on the media in the same space as the transponder is positioned when being interrogated.

SUMMARY

According to an exemplary embodiment, an RFID system for selectively communicating with a targeted transponder from among a group of multiple adjacent transponders is provided. The RFID system may include a transponder conveyance system and an antenna. The transponder conveyance system is configured to transport at least one targeted transponder from a group of multiple adjacent transponders through a transponder encoding area along a feed path. The antenna includes a resonant inductor and a shielding element. The shielding element partially encloses the resonant inductor thereby defining an exposed portion of the resonant inductor and an enclosed portion of the resonant inductor. The exposed portion of the resonant inductor may further define a coupling portion. The coupling portion extends lengthwise in the feed direction for providing lateral movement through the transponder encoding area of the targeted transponder relative to the antenna.

The RFID system may also include a transceiver configured to generate one or more electrical signals. The antenna may be configured to generate a magnetic flux in an encoding area for communicating with the targeted transponder based on the one or more electrical signals.

In some embodiments the targeted transponder may be attached to a media unit. The RFID system may include a printhead for printing indicia on the media unit. For example, the printing of indicia occurs within the transponder encoding area.

The resonant inductor may include a spiral coil on a printed circuit board. The spiral coil may be planar, for example, it may define a first plane. The targeted transponder may also define a plane, referred to as a second plane. The first and second planes may be either parallel or orthogonal to one another.

The shielding element may comprise a ferrite material.

In another exemplary embodiment, a system for processing a targeted transponder among at least an adjacent upstream transponder and an adjacent downstream transponder is provided. Each of the targeted transponder, upstream transponder, and downstream transponder define a length in a feed direction. The system includes an antenna and a transponder conveyance system. The antenna defines a length extending in the feed direction that is approximately equal to or less than the length of each of the targeted transponder, the upstream transponder, and the downstream transponder and is configured to generate magnetic field. The transponder conveyance system is configured to transport the downstream transponder, the targeted transponder, and the upstream transponder along a feed path to an interrogation position in which the targeted transponder and the antenna are substantially aligned lengthwise. In the interrogation position, at least a portion of the targeted transponder collects magnetic flux of the magnetic field capable of activating the targeted transponder and neither the upstream transponder nor the downstream transponder collects magnetic flux of the magnetic field capable of activation.

According to this embodiment, the antenna is configured to generate a magnetic field in the transponder encoding area in response to the one or more electrical signals generated by the transceiver for communicating with the targeted transponder. The magnetic field may be represented by a plurality of flux lines and the antenna may be positioned relative to the feed path such that the plurality of flux lines extends generally perpendicular to the feed direction.

In yet another exemplary embodiment, a printer-encoder for printing and encoding a series of transponders is provided. The printer-encoder may include a housing, a transponder conveyance system, a transceiver, an antenna, and a printhead. The transponder conveyance system may be configured to transport at least one targeted transponder from a group of multiple adjacent transponders from a supply source along a feed path to a media exit of the housing. Each transponder defines at least a first transponder activation flux within the housing and a second transponder activation flux outside the housing. The antenna may be configured to transmit a magnetic flux in response to electrical signals from the transceiver. The magnetic flux is greater than or equal to the first transponder activation flux in a transponder encoding area within the housing for communicating with a targeted transponder in the transponder encoding area and is less than the second transponder activation flux outside the housing. The printhead may be approximate to the media exit of the housing and the antenna and be configured to print indicia on the media units of which the transponders are attached.

The transponder conveyance system may include a platen roller adjacent the media exit and the antenna. The transponder encoding area may be less than a length of a media unit from the media exit.

Another embodiment of the present invention provides a method. The method may include providing an antenna having a resonant inductor and a shielding element that partially encloses the resonant inductor thereby defining an exposed portion of the resonant inductor and an enclosed portion of the resonant inductor, and wherein the exposed portion of the resonant inductor extends substantially parallel to and along a feed path; transporting a targeted transponder out of the plurality of transponders along the feed path into an encoding area; and sending one or more electrical signals to the antenna such that the exposed portion of the resonant inductor emits a magnetic flux into the encoding area for communicating with the targeted transponder.

The method may also include printing indicia onto a media unit, wherein the targeted transponder is attached to the media unit and providing a transceiver in communication with the antenna and configured to generate the one or more electrical signals.

BRIEF DESCRIPTION OF THE SEVERAL VIEWS OF THE DRAWINGS

FIG. 3a illustrates a first position of a transponder to an antenna;

FIG. 3b illustrates a second position of the transponder to the antenna of FIG. 3a;

FIG. 3c illustrates a third position of the transponder to the antenna of FIG. 3a;

FIG. 3d illustrates a fourth position of the transponder to the antenna of FIG. 3a;

FIG. 3e illustrates a fifth position of the transponder to the antenna of FIG. 3a;

FIG. 3f illustrates a sixth position of the transponder to the antenna of FIG. 3a;

FIG. 3g illustrates interrogation intervals between the transponder and antenna of FIG. 3a;

DETAILED DESCRIPTION

Figure 1:
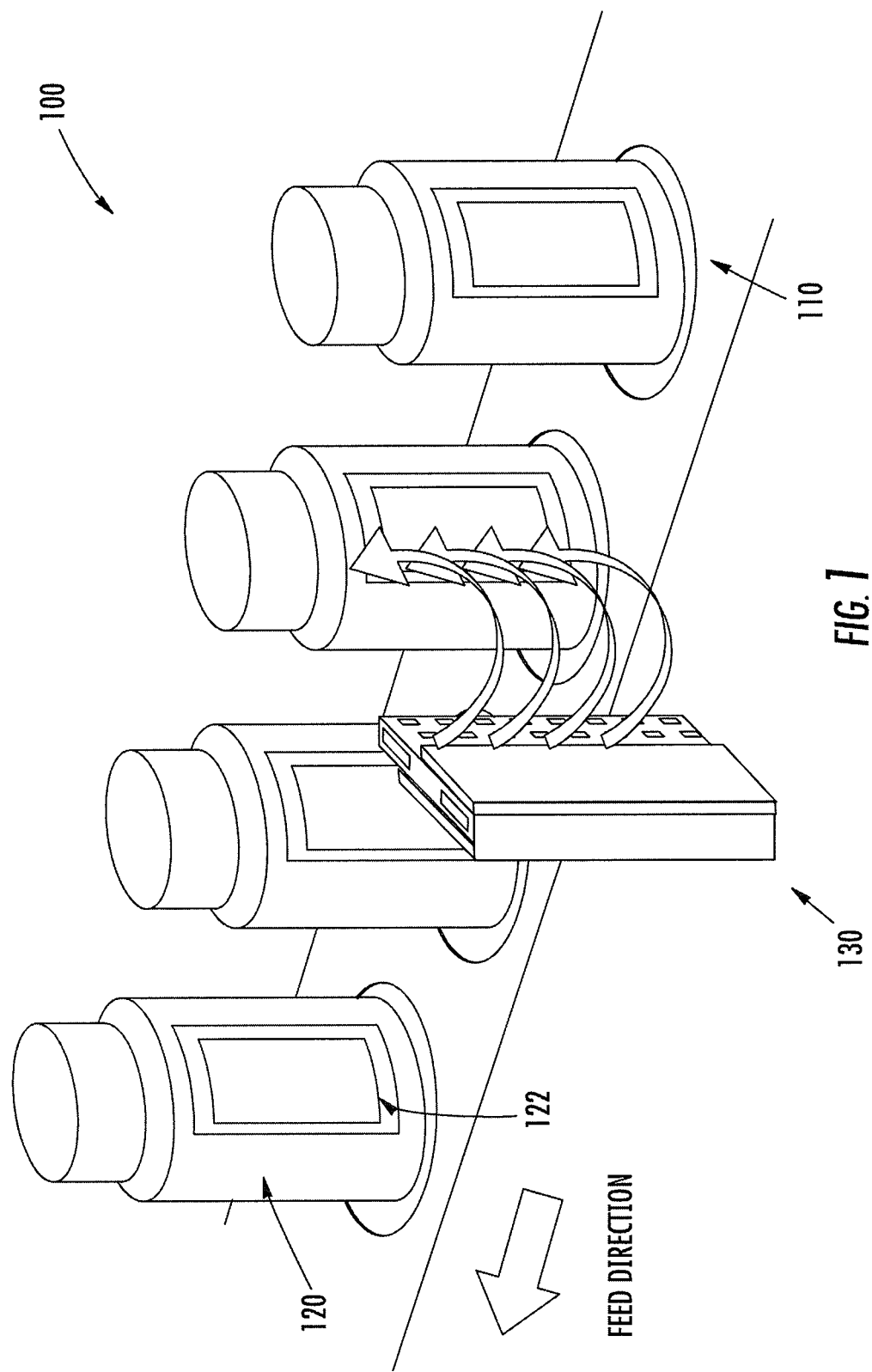
FIG. 1 illustrates a HF antenna for an item-level RFID system having a conveyance means.

The present invention now will be described more fully hereinafter with reference to the accompanying drawings, in which some, but not all embodiments of the invention is shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

RFID technology originally developed for automated identification of aircraft and ships as a secondary radar applications, has become a powerful tool in business process automation in many industries. HF RFID (High Frequency RFID) is based on magnetic coupling between a transponder and an antenna and is highly immune to the interferences typical for industrial environments. A variety of HF RFID applications exists today. Many manufacturing and service industries have adopted this technology, including medication authentication in the pharmaceutical industry, patient identification in the healthcare industry, product identification and inventory tracking in the retail industry, access restriction for security systems and tickets processing in transportation service. A wide application spectrum spreads from commercial and military to home and entertainment sectors. Recently introduced Near Field Communication (NFC) technology is also based on the magnetic coupling technology and is similar to Contactless Smart Card protocol. This technology opens new applications for the RFID technology, such as for example, automatic payment using cellular phones in close proximity communication as a transaction vehicle.

Three elements may comprise a RFID system: a transceiver (also referred to herein as a reader), a transponder, and an antenna. In order to satisfy the growing demands of the HF RFID equipment many vendors offer two of the three— the HF Readers and the transponders. The third element of the system, the antenna, is not readily available. Although HF magnetic antennas are offered for radio broadcasting, transmission sources location finders, and for EMI/RFI measurements, HF RFID antenna selection is limited. While RFID and non-RFID magnetic antennas share common features such as sensitivity to the magnetic component of RF wave and the ability to generate one, two principal differences exist.

First, HF RFID antennas activate passive transponders (i.e., transponders without an internal power source) by transferring the magnetic field energy to them. Second, antennas maintain bi-directional data transfer between the reader and transponders. The transponder data transmission is based on the "load" modulation technique which enables the reader to detect an antenna impedance modulation caused by the transponder. The reader may be configured to be sensitive enough to assure reliable transponder interrogation as soon as it gets energized.

RFID magnetic antennas for conventional applications are aimed at activation and identification of multiple transponders at the longest possible range. The goal of the antenna design for such applications is to detect transponders' presence and provide a wide coverage area. Transponders are activated by a uniform magnetic field and the antenna interaction within the interrogation zone is largely independent of their parameters.

An antenna design methodology considerably changes for RFID applications that demand an encoding of a single, targeted transponder surrounded by others. For these applications, a targeted transponder is positioned in very close proximity to an antenna and a specified interrogation region (also referred to herein as a transponder encoding area) may be comparable with transponder dimensions. In this situation an antenna-transponder distance is only a small division of their sizes, transponders operate in principally heterogeneous magnetic field and their interaction with an antenna is heavily dependent as much on distance between them as on their dimensions and mutual alignment.

To be successful in performing an interrogation of only one transponder, an antenna may be configured to have a feature referred to as spatial selectivity ("SS"). Spatial selectivity is an antenna's ability to communicate with one, single transponder within a maximum available RF power from a reader and not communicate with neighboring or adjacent transponders.

To increase an antenna's SS, the magnetic field emitted from the antenna may be shielded and suppressed to minimize or control the magnetic field for entering adjacent areas outside of the transponder encoding area. A disadvantage of such approach is that dimensions of shielding components are greatly dependent on transponders geometry and must be adjusted for every new transponder type. The shielding of adjacent areas is only suitable for RFID applications which use one, exclusive form-factor transponder. RFID applications working with variety transponders the shielding method requires RF power increase and inevitably complicates RFID system including an antenna design and development.

Another strategy for achieving antenna high SS may be based on an antenna magnetic flux forming technique and specific antenna-transponder alignment. Considerations for such a strategy may include one or more of the following:

classification of RFID applications and parametric analysis of HF transponders—"RFID Applications Utilizing HF Transponders";

implementation of Transponder Activation Magnetic Flux parameter for a transponder in heterogeneous magnetic field and its association with geometry and electrical properties— "HE Transponders";

justification of new characterization parameters for an antenna-transponder structure and qualitative analysis of an interaction between a closely spaced conventional HF resonant loop antenna and transponder—"Antenna-Transponder Characterization";

SS antenna development and its mathematical model correlating system performance parameters with a transponder and antenna geometry and their mutual orientation— "Magnetic Flux through Transponder";

quantitative analysis of spatially selective antenna-transponder interaction for their two orthogonal alignments— "Antenna-Transponder Interaction";

antenna circuit components justification based on specified activation magnetic field, available Reader RF power and transponder coupled impedance—"Antenna Circuit".

RFID Applications Utilizing HF Transponders

HF RFID applications and their relevant antennas magnetically-coupled with transponders working in 13.56 MHz may be at least divided by two industry independent groups. A first group as was mentioned before represents a "spatially distributed items" application type. Antenna design for this group is aimed at achieving maximum operational range with transponders which are in a uniform magnetic field and located relatively far from an antenna or in any case weakly coupled with it. This group may be shortly characterized by an inequality $$S_{MAX} << D \quad (1)$$

where: $S_{MAX}$—maximum size (dimension) of an antenna or transponder; and D—distance between an antenna and transponder.

In such a relationship (i.e., the distance between the antenna and the transponder is much greater than the size of the transponder) the transponder receives a uniform or homologous magnetic field, the calculation of the antenna parameters is significantly simplified. In this type of relationship, an antenna magnetic flux density distribution is calculated for a point in place of transponder. An antenna can be designed almost independently on transponders position because their presence does not practically influencing antenna electrical properties.

Among huge variety of RFID applications a second group may be distinguished. This group represents a "conveyor"

type or an item-level RFID. A demand for an item-level identification may be encountered, for example, in PCB fabrication, automotive parts manufacturing and assembly, integrated circuit manufacturing, books sorting in libraries, tickets processing in transportation service, monetary value certificates handling, enhancement in gaming industry, home automation, pharmaceutical manufacturing, implantable medical devices, walking and reading assistance for visually impaired people, and smart packaging.

The conveyor type of applications is a scenario where transponders 122 (attached to the items 120) arranged one after another and prepared for a sequential interrogation in short distance to an antenna 132, e.g., as illustrated in FIG. 1. A reader has to identify only one targeted item that is surrounded by adjacent items (or more specifically transponders attached to the items). This group can be characterized by an inequality:

$$D \ll S_{MIN} \quad (2)$$

where: $S_{MIN}$—minimum size of an antenna or transponder. A few divisions of the second group of RFID applications may further include a "static-object" and "dynamic-object" sub-groups.

A "static-object" is an item (or more specifically a transponder) that has a consistent position for an interrogation, i.e., a close and fixed distance to the antenna. A grade of antenna-transponder coupling and their mutual alignment remain unchanged for every conveyor stop-cycle.

For a "dynamic-object", the aimed or targeted transponder is surrounded by other adjacent transponders. Unlike the "static-object" case, the position of the transponder to the antenna may vary. In this case, a relatively long interrogation range may be preferable for the transponder on its traveling way (also referred to as a feed path) along the continuously moving conveyor. Even with a relatively long interrogation range, it may be desirable for the reader to be configured to selectively interrogate only one predefined transponder among others.

In the case of dynamic objections under conditions of $D \ll S_{MIN}$, an antenna-transponder coupling grade in relation to their mutual alignment changes significantly. An antenna with low SS may activate a targeted transponder and other transponders, such as the two closely spaced adjacent transponders (one upstream and one downstream). Although, in some embodiments, a reader's anti-collision function (e.g., anti-collision firmware) may manage an identification of many simultaneously activated transponders, it is unable to confine a targeted transponder. To discriminate a targeted transponder at predefined location using such an antenna, the transponder would have to be spaced-apart great enough such that only one transponder is within the relatively long interrogation range. However, the extension of the separation interval between the transponders increases interrogation or processing time for the system. In the case of smart labels encoding in RFID printer-encoder system, an increase of transponders pitch (distance between transponders) causes carrier material waste, as explained in more detail further below.

In close proximity to an antenna the three dimensional ("3D") magnetic flux density is non-uniform and the magnetic flux through a transponder depends on its location and orientation in regards to antenna. As a result, for RFID applications described by $D \ll S_{MIN}$, the antenna is configured in view of transponder geometry and its electrical characteristics.

HF Transponders

The dimensions of typical transponders (also referred to as tags) used for HF item-level RFID and other applications vary from approximately 20 by 35 mm, for example, made by Texas Instrument and up to 85 by 135 mm, for example, made by UPM Rafsec. The transponder's specification usually includes ICs type, a resonant frequency with its tolerance and an important parameter for an antenna design—maximum required activation magnetic field strength $H_A$ in uniform field. The field strength ranges approximately from 98 to 120 [dBuA/m] depending on ICs used, transponder inductors and their dimensions. In practical design, it may be more convenient to use H value expressed in [A/m] units. The conversion [dBuA/m] to [A/m] unit gives $$H[A/m] = 10^{\{(H[dB\mu A/m] - 120)/20\}}$$

Consequently, the transponder activation magnetic flux density $B_A$ [Vs/m$^2$] for the uniform field can be obtained using $$B_A = \mu_0 H_A [Vs/m^2] \quad (3)$$

where: $\mu_0 = 4\pi \ast 1E\text{-}07$ [Vs/Am]—is the free-space magnetic permeability.

Parameter $H_A$ is specified for the uniform magnetic field and can be directly used in calculations of antennas satisfying an inequality of (1) above (i.e., $S_{MAX} \ll D$). For applications compliant with an inequality of (2) above (i.e., $D \ll S_{MIN}$), the transponders are in a heterogeneous magnetic field which flux density is spatially dependent. Antenna calculations for such case can not utilize the equation (3) and a Transponder Activation Magnetic Flux ("TAMF") $\Phi_A$ may be engaged instead. TAMF for a transponder which is perfectly tuned to an operational frequency may be found as $$\Phi_A = B_A A [Vs] \quad (4)$$

where: A—transponder loop area [m$^2$]. The value A in (4) is the geometry mean dimensions (GMDm) and must be used instead of transponder coil physical dimensions. The time varying magnetic flux induces the voltage $V_C$ in transponder coil tuned at resonance equal to an operational frequency $f_O$ [Hz], thus $$V_C = 2\pi f_O Q B A N_T$$

or using magnetic flux it gives $$V_C = 2\pi f_O Q N_T \Phi$$

where: Q—transponder quality factor; and $N_T$—number of turns of transponder coil.

If transponder resonant frequency is $f_R$ and different than frequency $f_O$ then transponder voltage amplification will depend on degree of frequency deviation from the operational frequency ($f_R$-$f_O$). Linking voltage $V_C$ (5) of the parallel resonant circuit, which is typical for HF transponders, with IC's specified supply voltage $V_A$, gives $$V_C = V_A \sqrt{1 + \left[\left(\frac{2(f_R - f_O)}{f_R}\right)Q\right]^2} \quad (6)$$

The equation (6) concludes the more a transponder is detuned the higher voltage $V_C$ is required to achieve $V_A$. Then transponder activation flux $\Phi_A$ can be derived equating (6) and (5) and is given by $$\Phi_A = \frac{V_A \sqrt{1 + \left[\left(\frac{2(f_R - f_O)}{f_R}\right)Q\right]^2}}{2\pi f_O Q N_T} \quad (7)$$

From the formula (7) follows that detuned transponder with low Q-factor will have a higher activation magnetic flux comparing with tuned, high Q transponder.

Figure 2:
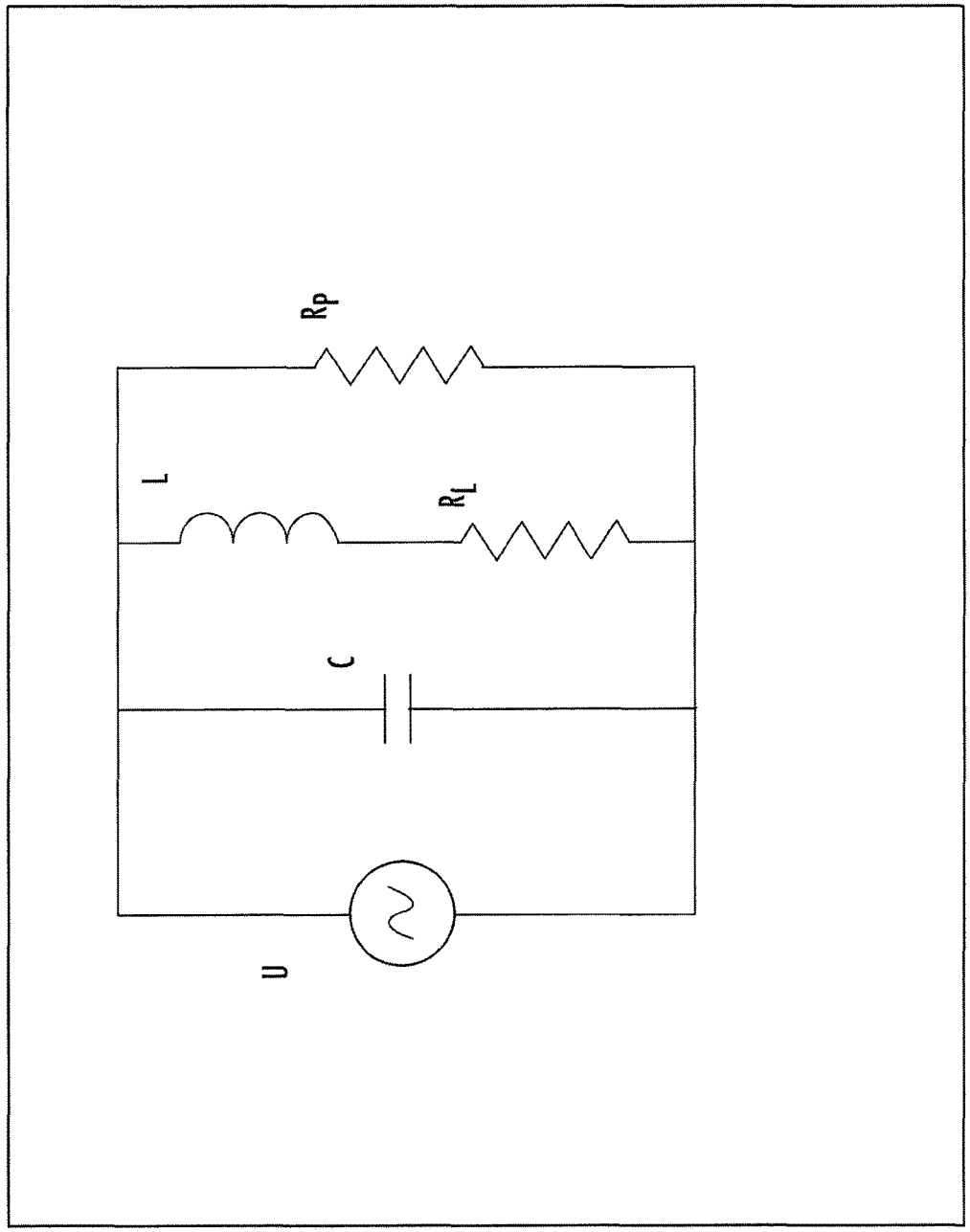
FIG. 2 illustrates a transponder equivalent circuit.

In a general case, a quality factor of the parallel resonance circuit may be found by considering a transponder equivalent schematic (as illustrated in FIG. 2), which includes resonant tuning capacitor C (comprising an imaginary part of an IC's impedance), coil inductance L, resistor $R_L$ presenting an inductor losses and resistor $R_P$, which simulates a real part of an IC's impedance. The Q-factor for LCR parallel circuit is determined as $$Q = \frac{1}{\frac{R_L}{2\pi f_R L} + \frac{2\pi f_R L}{R_P}} \quad (8)$$

Considering (7) and (8) $\Phi_A$ value given by (7) is higher than an activation flux calculated in (4) for tuned transponder.

In heterogeneous magnetic field a transponder gets activated when Magnetic Flux through Transponder (MFT) $\Phi_T$ exceeds $\Phi_A$ value. Then the activation flux $\Phi_A$ can be used in an antenna-transponder evaluation and analysis as a threshold which is defining boundary conditions for transponder activation interval. An integral parameter MFT characterizing an antenna-transponder structure is given by $$\Phi_T = \int\int_A \overrightarrow{B_{X,Y,Z}} * d\vec{A}[Vs] \quad (9)$$

where $B_{X,Y,Z}$—is 3D distribution of the magnetic flux density (normal to a surface of transponder coil) and linear function of the current I circulating in antenna coil. This current is defined by Reader RF power and antenna equivalent impedance. The impedance of the loop antenna tuned to resonance can be presented by few components. It consists of a radiation resistance, a resistance that is equivalent to resistive losses of the coil, including tuning and matching elements and impedance that is induced by a transponder via magnetic coupling. Considering a fact that a total circumference of an antenna coil is much shorter than an operational wavelength, a radiation resistance can be neglected. To simplify further an initial analysis of an antenna-transponder interaction it is assumed that magnetic flux in antenna coil that is produced by the current in transponder is insignificant comparing with magnetic flux produced by an antenna itself. This assumption therefore implies that impedance induced by a tuned transponder is much smaller then a tuned antenna resistive losses.

Antenna-Transponder Characterization

HF antenna and transponder working in immediate proximity to each other form a virtual device with one bi-directional RF port. Properties of this new device are defined by both elements—an antenna and transponder and traditional antenna characteristics such as directivity or antenna gain become inappropriate for the description of such combined structure. One-port RF device further complicates its performance assessment. Only two characteristics of antenna-transponder conglomerate are practically available for testing. They are antenna impedance and RF power level for which a reader indicates if transponder interrogation process (including a completion of write and read commands) has been successful or not. With the aim of finding proper way of characterization of an antenna-transponder constitution a set of new parameters was established and implemented. Among them are a spatial selectivity (SS) introduced earlier, RF power margin, relative activation power and transponder activation interval. These parameters are measurable and capable of describing antenna-transponder properties and performance such as transponder activation interval and system robustness.

Spatial selectivity (as much as other parameters) is not an attribute of an antenna itself but rather a characteristic of an antenna-transponder combined structure. By definition, a high SS implies that for activation of a targeted transponder, located in an encoding interval (i.e., transponder encoding region), an antenna requires much less power than maximum power available from the reader. Upon assigning $P_{TAT}$ for minimum RF power to activate a transponder in targeted area and $P_{TAA}$ for power required for transponder activation in adjacent areas, SS parameter is obtained as $$SS = 10\text{Log}\frac{P_{TAA}}{P_{TAT}}[\text{dB}]. \quad (10)$$

SS can also be defined by the magnetic flux ratio using value $\Phi_A$ (4) and flux trough an adjacent transponder $\Phi_{TAD}$ $$SS = 20\text{Log}\frac{\Phi_A}{\Phi_{TAD}}[\text{dB}]. \quad (11)$$

RF power margin $\Psi$ is another important parameter directly related to transponder activation interval or an operational range. As was mentioned above one-port device allows practical measurement of antenna minimum RF power when a reader indicates establishing a communications with transponder for its different positions inside an activation interval. Obviously the lower power is applied to an antenna the shorter this interval. By attenuating maximum available from reader RF power $P_0$ to the level $P_{MIN}$ when a specified activation interval is achieved a power margin $\Psi$ can be defined as $$\Psi = 10\text{Log}\frac{P_0}{P_{MIN}}[\text{dB}]. \quad (12)$$

Applying the same power suppression method as was used in (12) a relative activation power $\Xi$ can be defined as the ratio between a reader RF power $P_0$ and a power $P_A$ applied to an antenna that changes transponder status from a non-activated to an activated and vise versa for any position inside an activation interval $$\Xi = 10\text{Log}\frac{P_0}{P_A}[\text{dB}]. \quad (13)$$

RF power margin (12) and relative activation power (13) are two versatile parameters describing an antenna-transponder energy transfer regardless of an impact of the environmental conditions their individual characteristics might have.

High SS might be achieved by changing antenna properties to make a low magnetic field strength for adjacent areas and narrow activation interval for a targeted transponder. A properly designed antenna with high SS does not activate adjacent transponders even at maximum available RF power. For applications working with multi-dimensional transponders a short activation interval is the most preferable. In an ideal case, this interval should be equal or less than a length of the shortest transponder type engaged.

Likewise (13) the relative activation flux Θ man be acquired as $$\Theta = 20\text{Log}\frac{\Phi_T}{\Phi_A} \text{ [dB]}.$$

Thus the boundary points of an interaction interval may be found using (13) when $\Xi$ =0. Practically an interaction interval is measured by registering two transponder positions where a reader starts and stops its communications still supplying an antenna with maximum RF power. Parameter $\Xi$ inside an interaction interval for any transponder position is measured by attenuating maximum available RF power from a reader up to the point when its communications with a transponder fails. An attenuation value expressed in dB corresponds to $\Xi$. Collection of this test results allows reconstruction of transponder performance map for its activation interval. This map assures detection of any inconsistencies an interrogation region might have. Together with the measurement of RF power margin Ψ (12) a $\Xi$ test data enable system robustness analysis and antenna design verification. Such strong actions are necessary because antennas and transponders parameters have natural deviations from their nominal values. Transponder activation flux by being an integral characteristic of an antenna-transponder couple is very sensitive to these deviations and so is relative activation power. Antenna tuning frequency shift, RF port impedance mismatch, transponder resonant frequency detuning and its excessive losses, ICs impedance variations, just to name few, are occurred in manufacturing process and also often caused by an influence of operational environmental conditions. High power margin compensates an increase of TAMF in RFID systems and thus makes an interrogation process more reliable.

Introduced characterization parameters are instrumental in analysis of an antenna-transponder interaction and may be demonstrated on an example of a conventional electrically small HF resonant rectangular loop antenna. This antenna for a conveyor type of scenario is located in parallel plane apart with a transponder but in very close proximity to it. The total magnetic flux through transponder is contributed by few spatially distributed antenna elements 301, 302, 303, 304 (which make up the coil structure of the antenna) and changes along transponder 310 traveling way above an antenna 300, as illustrated in FIGS. 3a through 3g, depending on antenna-transponder instant alignments. When a transponder 310 approaches an antenna 300 it makes use of a flux practically only from an element 303, as illustrated in FIG. 3a. Elements 301, 302, and 304 make an insignificant flux contribution. A flux via transponder 310 attains first maximum value when a transponder 310 leading edge is right above the element 303, as illustrated in FIG. 3b.

Figure 3:
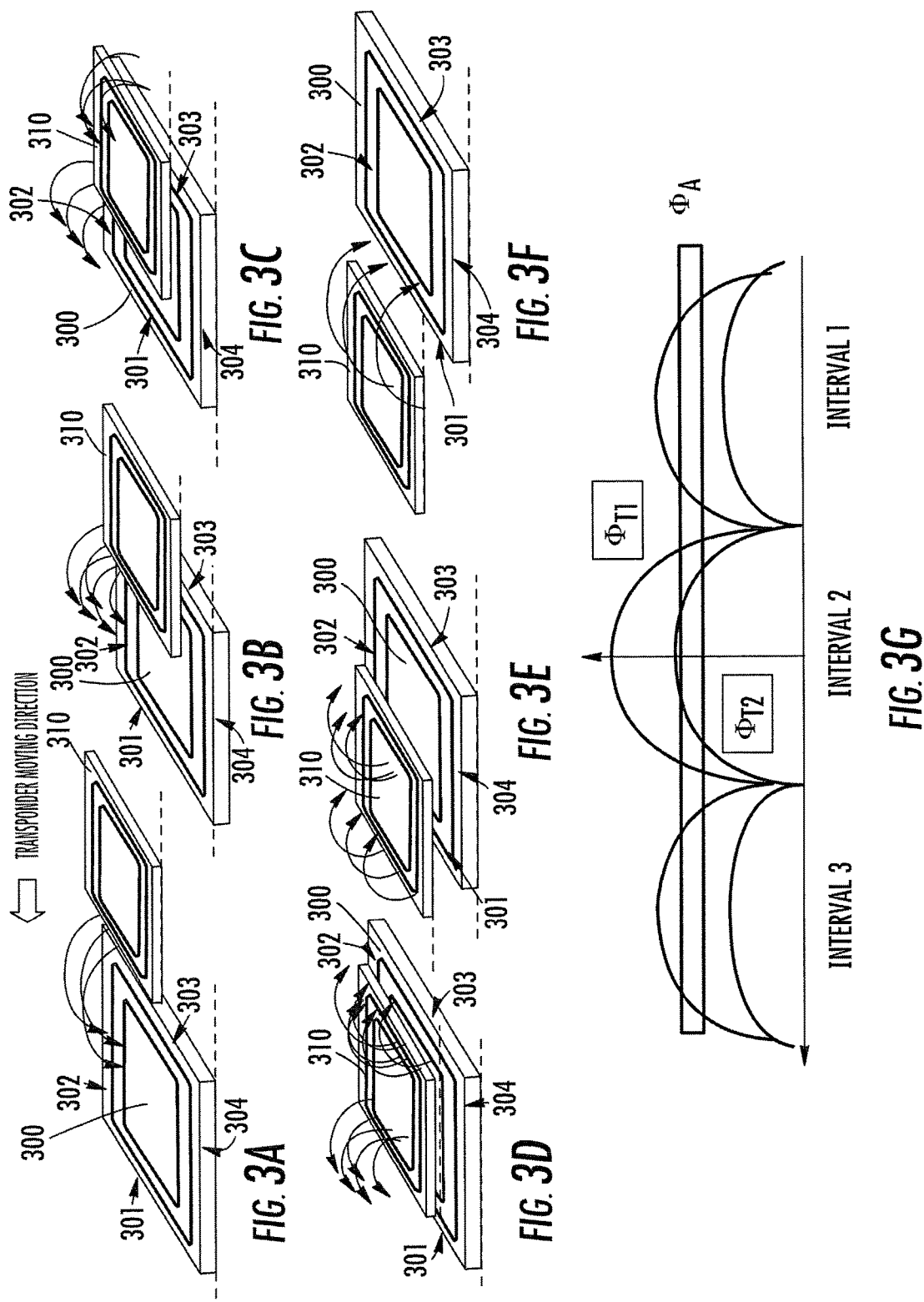

While a center of the transponder 310 is approximately above the element 303, as illustrated in FIG. 3c, the antenna element 301 supplies the transponder 310 with magnetic flux having a direction that opposes flux from element 303 and, thus, dropping a total magnetic flux through transponder 310 to zero. As the transponder 310 becomes co-centered with the antenna 300, as illustrated in FIG. 3d, elements 301, 302, 303, and 304 supply the transponder 310 with unidirectional magnetic flux. Further transponder movement causes the same interaction, as illustrated in FIGS. 3e and 3f and as was described above. This includes the position illustrated in FIG. 3 where the center of the transponder 300 is approximately above the element 301. In this position, the antenna element 303 supplies the transponder 310 with magnetic flux having a direction that opposes flux from element 301 and, thus, dropping a total magnetic flux through transponder 310 to zero. It may be concluded that the transponder on its traveling way encounters three distinguished intervals 1, 2, and 3 where its flux $\Phi_{T1}$ exceeds a Transponder Activation Magnetic Flux $\Phi_A$ as illustrated in FIG. 3g. For a conveyor type of RFID applications these three intervals may correspond to the positions of a targeted transponder and two adjacent transponders (i.e., one upstream and one downstream from the targeted transponder). In accordance with equation (11) the antenna is not spatially selective and creates a collision situation.

Analyzing a total flux through transponder at different positions, for example, as illustrated in FIG. 3g, one may suggest to attenuate RF power from a reader in order to reduce the magnetic flux ($\Phi_{T2}$) and achieve a single interrogation interval thus improving SS of an antenna. While this suggestion is valid it works only under one condition, in which the RFID system will always use single form-factor transponders with zero parameters tolerances. However, as a practical matter, a RFID system must be capable of working with different transponder dimensions. Moreover, transponders from the same group have normally distributed parameters around their specified values and the flux $\Phi_A$ becomes a zone. The expansion of the line $\Phi_A$ is related to transponders, for example, resonance frequency (7) and Q-factor (8) deviation effects. Decreasing an antenna magnetic flux worsens flux margin and could cause a low encoding yield of transponders because of low RF power margin (12).

Following a design rule of "3 dB", it may be concluded that in order to achieve an antenna high performance, SS for the intervals 1 and 2 and power margin Ψ for the interval 1 (FIG. 3-g) should be equal or exceed 3 dB.

Magnetic Flux Through Transponder

One of the possible ways to overcome multi-interval of antenna-transponder interaction and improve an antenna performance is to use a finite conductive element (or elements grouped together) for the magnetic flux generation. The element can be a short straight wire carrying a time varying current. With the aim of achieving high SS, a straight short wire alike HF antenna has been proposed and implemented for smart label encoding in RFID Printer-Encoders as disclosed in U.S. Pat. No. 6,848,616, which is hereby incorporated by reference in its entirety. This antenna is based on conventional resonant rectangular loop antenna fabricated on PCB, which traces perform a role of wires. The three sides of an antenna are covered or enclosed by a shielding element, such as a flexible ferrite patch, and one side is left open as shown in FIG. 1. The ferrite patch while amplifying the magnetic flux generated by traces of an antenna is also forming a shape of magnetic flux and increasing a coil inductance and its Q-factor.

To analyze performance of this antenna and estimate its SS, a mathematical model may be developed. The model by establishing a relationship between mechanical and electrical characteristics of an antenna-transponder structure enables a comparison of its parameters for two orthogonal alignments.

As discussed above, magnetic flux through transponder $\Phi_T$ is a powerful parameter used for an antenna-transponder quality and performance characterization. It may be found using equation (9) stated above. In general, this formula includes a spatial distribution of the non-uniform magnetic flux density generated by a current through finite length rod, which diameter is much smaller then antenna-transponder separation distance.

Figure 4:
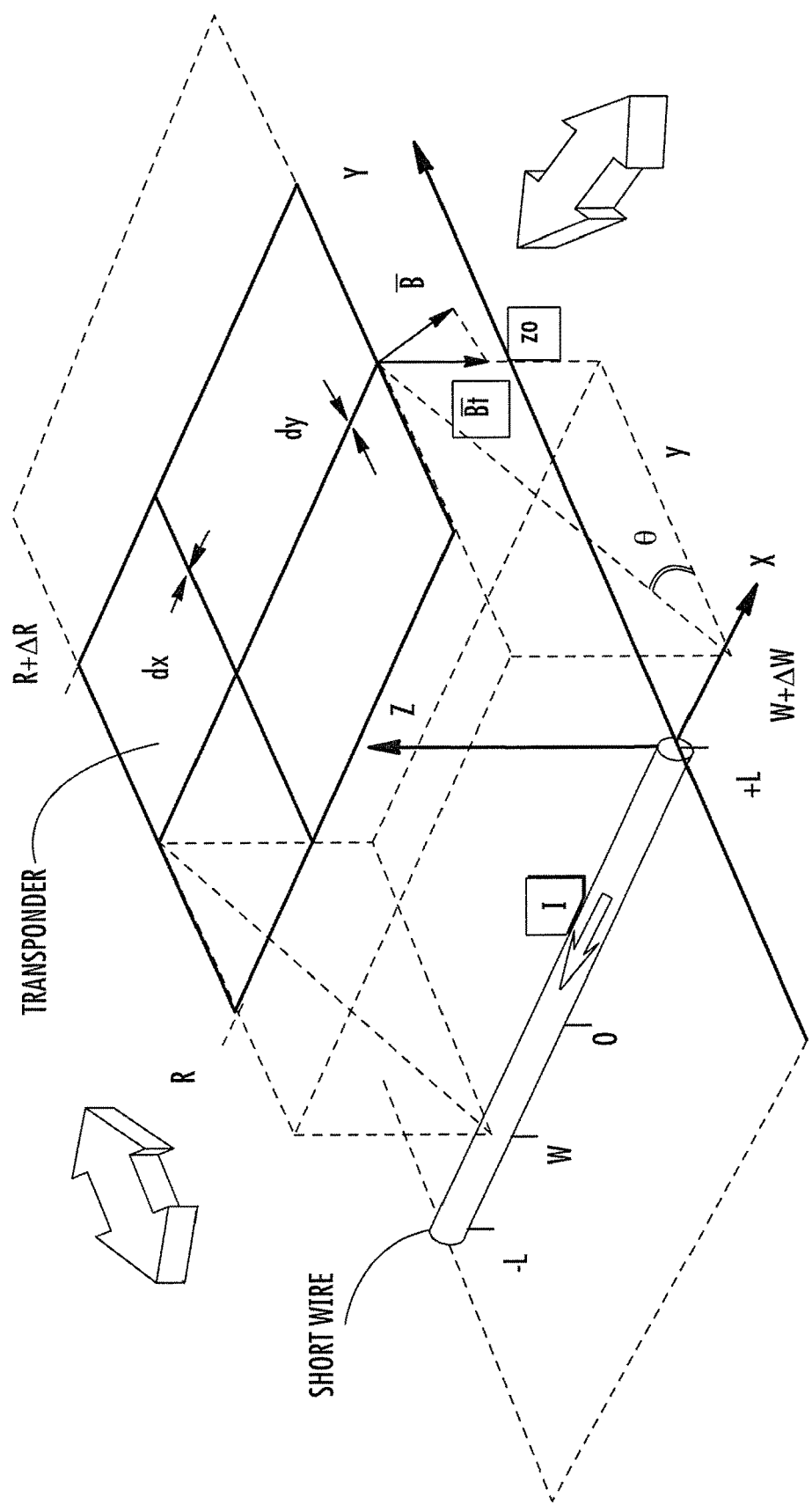
FIG. 4 illustrates a magnetic flux density produced in any field point by a short wire carrying a current and a transponder.

The normal to a transponder plane, the magnetic flux density produced in any field point by a short wire of length 2L carrying a current I along the (−x) direction, as illustrated in FIG. 4, in accordance with Biot-Savart Law is written for a general case as $$B = \frac{\mu_0 NIy}{4\pi(y^2+z_0^2)}\left(\frac{x+L}{\sqrt{(x+L)^2+(y^2+z_0^2)}} - \frac{x-L}{\sqrt{(x-L)^2+(y^2+z_0^2)}}\right) \quad (14)$$

An equation (14) includes normalization of vector B to a transponder plane by accepting an angle θ.

$$\cos\theta = \frac{y}{\sqrt{y^2+z_0^2}}$$

Integration area of the transponder illustrated in FIG. 4 is limited by its width ΔW and length ΔR. The total MFT $\Phi_T$ (9) for the interval Y≥0 may be obtained then by summing over contributions from all transponder area differential elements dA=dxdy.

$$\Phi_T = \frac{\mu_0 NI}{4\pi}\left\{\int_R^{R+\Delta R}\frac{ydy}{(y^2+z_0^2)}\int_W^{W+\Delta W}\frac{(x+L)dx}{\sqrt{(x+L)^2+(y^2+z_0^2)}} - \right. \quad (15)(a)$$
$$\left. \int_R^{R+\Delta R}\frac{ydy}{(y^2+z_0^2)}\int_W^{W+\Delta W}\frac{(x+L)dx}{\sqrt{(x-L)^2+(y^2+z_0^2)}}\right\}$$

$$\int_W^{W+\Delta W}\frac{(x+L)dx}{\sqrt{(x+L)^2+(y^2+z_0^2)}} \quad (15)(b)$$

To do the integral, the following substitution may be used: x+L=ρ and $y^2+z_0^2=\varepsilon^2$ then dρ=dx and an integral from formula "i88"

$$\int\frac{\rho}{\sqrt{(\rho^2+\varepsilon^2)}}d\rho = \sqrt{\rho^2+\varepsilon^2} \quad (15)(c)$$

Integral (15)(b) may be written as:

$$\sqrt{(y^2+z_0^2)+(x+L)^2}\Big|_W^{W+\Delta W} = \sqrt{(y^2+z_0^2)+(W+\Delta W+L)^2} - \sqrt{(y^2+z_0^2)+(W+L)^2} \quad (15)(d)$$

or equation (15)(d) may be presented in a form of $$=\sqrt{y^2+[z_0^2+(W+\Delta W+L)^2]} - \sqrt{y^2+[z_0^2+(W+L)^2]} \quad (15)(e)$$

substituting first component in (15)(a)

$$\int_R^{R+\Delta R}\left(\frac{y\sqrt{y^2+[z_0^2+(W+\Delta W+L)^2]}}{(y^2+z_0^2)} - \right. \quad (15)(f)$$

$$\left. \frac{y\sqrt{y^2+[z_0^2+(W+L)^2]}}{(y^2+z_0^2)}\right)dy$$

To do the integral of (15)(f) the following substitution may be used for the first component:

$$\lambda = \sqrt{y^2+[z_0^2+(W+\Delta W+L)^2]} \text{ then}$$
$$\lambda^2 = y^2+[z_0^2+(W+\Delta W+L)^2]$$
$$y^2 = \lambda^2-[z_0^2+(W+\Delta W+L)^2] \text{ and}$$
$$y = \sqrt{\lambda^2-[z_0^2+(W+\Delta W+L)^2]} \text{ then}$$
$$dy = \frac{\lambda}{\sqrt{\lambda^2-[z_0^2+(W+\Delta W+L)^2]}}d\lambda$$

and the following substitution may be used for the second component:

$$\sigma = \sqrt{y^2+[z_0^2+(W+L)^2]} \text{ then } \sigma^2 = y^2+[z_0^2+(W+L)^2]$$
$$y^2 = \sigma^2-[z_0^2+(W+L)^2] \text{ and } y = \sqrt{\sigma^2-[z_0^2+(W+L)^2]}$$
$$\text{then } dy = \frac{\sigma}{\sqrt{\sigma^2-[z_0^2+(W+L)^2]}}d\sigma$$

Integral (15)(f) may be written as:

$$\int_R^{R+\Delta R}\frac{\lambda^2}{\lambda^2-(W+\Delta W+L)^2}d\lambda - \int_R^{R+\Delta R}\frac{\sigma^2}{\sigma^2-(W+L)^2}d\sigma$$

substituting $(W+\Delta W+L)^2=\xi^2$ and $(W+L)^2=a^2$ $$\int\frac{\lambda^2}{\lambda^2-\xi^2}d\lambda = \lambda - \frac{\lambda}{2}\mathrm{Ln}\left|\frac{\xi+\lambda}{\xi-\lambda}\right| \text{ and} \quad \text{[formula "i61"169,]}$$

$$\int\frac{\sigma^2}{\sigma^2-a^2}d\sigma = \sigma - \frac{a}{2}\mathrm{Ln}\left|\frac{a+\sigma}{a-\sigma}\right|$$

Then two components of integral (15)(f) may be rewritten as $$\sqrt{y^2+[z_0^2+(W+\Delta W+L)^2]}\Big|_R^{R+\Delta R} - \frac{(W+\Delta W+L)}{2}\mathrm{Ln} \quad (15)(g)$$

$$\left|\frac{(W+\Delta W+L)+\sqrt{y^2+z_0^2+(W+\Delta W+L)^2}}{(W+\Delta W+L)-\sqrt{y^2+z_0^2+(W+\Delta W+L)^2}}\right|\Big|_R^{R+\Delta R}$$

and $$\sqrt{y^2+[z_0^2+(W+L)^2]}\Big|_R^{R+\Delta R} \quad (15)(h)$$

$$-\frac{(W+L)}{2}\mathrm{Ln}\left|\frac{(W+L)+\sqrt{y^2+z_0^2+(W+L)^2}}{(W+L)-\sqrt{y^2+z_0^2+(W+L)^2}}\right|\Big|_R^{R+\Delta R}$$

using (15)(g) and (15)(h) integral (15)(f) is then $$\sqrt{(R+\Delta R)^2 + z_0^2 + (W+\Delta W + L)^2} - \qquad (15)(i)$$
$$\sqrt{(R)^2 + z_0^2 + (W+\Delta W + L)^2} -- \frac{(W+\Delta W + L)}{2}\text{Ln}$$
$$\left|\frac{(W+\Delta W + L) + \sqrt{(R+\Delta R)^2 + z_0^2 + (W+\Delta W + L)^2}}{(W+\Delta W + L) - \sqrt{(R+\Delta R)^2 + z_0^2 + (W+\Delta W + L)^2}}\right| ++$$
$$\frac{(W+\Delta W + L)}{2}\text{Ln}$$
$$\left|\frac{(W+\Delta W + L) + \sqrt{R^2 + z_0^2 + (W+\Delta W + L)^2}}{(W+\Delta W + L) - \sqrt{R^2 + z_0^2 + (W+\Delta W + L)^2}}\right| --$$
$$\sqrt{(R+\Delta R)^2 + z_0^2 + (W+L)^2} + \sqrt{(R)^2 + z_0^2 + (W+L)^2} ++$$
$$\frac{(W+L)}{2}\text{Ln}\left|\frac{(W+L) + \sqrt{(R+\Delta R)^2 + z_0^2 + (W+L)^2}}{(W+L) - \sqrt{(R+\Delta R)^2 + z_0^2 + (W+L)^2}}\right| --$$
$$\frac{(W+L)}{2}\text{Ln}\left|\frac{(W+L) + \sqrt{R^2 + z_0^2 + (W+L)^2}}{(W+L) - \sqrt{R^2 + z_0^2 + (W+L)^2}}\right|$$

By repeating procedure above for:

$$-\int_W^{W+\Delta W} \frac{(x-L)dx}{\sqrt{(x-L)^2 + (y^2 + z_0^2)}}$$

and substituting a second component in (15)(a)

$$-\int_R^{R+\Delta R} \frac{\gamma^2}{\gamma^2 - (W+\Delta W - L)^2}d\gamma + \int_R^{R+\Delta R} \frac{\nu^2}{\nu^2 - (W-L)^2}d\nu$$
where
$$\gamma = \sqrt{y^2 + [z_0^2 + (W-L)^2]} \text{ and } \nu = \sqrt{y^2 + [z_0^2 + (W-L)^2]}$$

one may compute $$-\sqrt{(R+\Delta R)^2 + z_0^2 + (W+\Delta W - L)^2} + \qquad (15)(j)$$
$$\sqrt{(R)^2 + z_0^2 + (W+\Delta W - L)^2} ++ \frac{(W+\Delta W - L)}{2}\text{Ln}$$
$$\left|\frac{(W+\Delta W - L) + \sqrt{(R+\Delta R)^2 + z_0^2 + (W+\Delta W - L)^2}}{(W+\Delta W - L) - \sqrt{(R+\Delta R)^2 + z_0^2 + (W+\Delta W - L)^2}}\right| --$$
$$\frac{(W+\Delta W - L)}{2}\text{Ln}$$
$$\left|\frac{(W+\Delta W - L) + \sqrt{R^2 + z_0^2 + (W+\Delta W - L)^2}}{(W+\Delta W - L) - \sqrt{R^2 + z_0^2 + (W+\Delta W - L)^2}}\right| ++$$
$$\sqrt{(R+\Delta R)^2 + z_0^2 + (W-L)^2} +$$
$$\sqrt{(R)^2 + z_0^2 + (W-L)^2} -- \frac{(W-L)}{2}\text{Ln}$$
$$\left|\frac{(W-L) + \sqrt{(R+\Delta R)^2 + z_0^2 + (W-L)^2}}{(W-L) - \sqrt{(R+\Delta R)^2 + z_0^2 + (W-L)^2}}\right| ++$$
$$\frac{(W-L)}{2}\text{Ln}\left|\frac{(W-L) + \sqrt{R^2 + z_0^2 + (W-L)^2}}{(W-L) - \sqrt{R^2 + z_0^2 + (W-L)^2}}\right|$$

The final result may be obtained by adding (15)(i) and (15)(j).

$$\Phi_T = \frac{\mu_0 NI}{4\pi}\left\{\sqrt{(R+\Delta R)^2 + z_0^2 + (W+\Delta W + L)^2} - \right. \qquad (16)$$
$$\sqrt{(R)^2 + z_0^2 + (W+\Delta W + L)^2} -- \frac{(W+\Delta W + L)}{2}\text{Ln}$$
$$\left|\frac{(W+\Delta W + L) + \sqrt{(R+\Delta R)^2 + z_0^2 + (W+\Delta W + L)^2}}{(W+\Delta W + L) - \sqrt{(R+\Delta R)^2 + z_0^2 + (W+\Delta W + L)^2}}\right| ++$$
$$\frac{(W+\Delta W + L)}{2}\text{Ln}$$
$$\left|\frac{(W+\Delta W + L) + \sqrt{R^2 + z_0^2 + (W+\Delta W + L)^2}}{(W+\Delta W + L) - \sqrt{R^2 + z_0^2 + (W+\Delta W + L)^2}}\right| --$$
$$\sqrt{(R+\Delta R)^2 + z_0^2 + (W+L)^2} + \sqrt{(R)^2 + z_0^2 + (W+L)^2} ++$$
$$\frac{(W+L)}{2}\text{Ln}\left|\frac{(W+L) + \sqrt{(R+\Delta R)^2 + z_0^2 + (W+L)^2}}{(W+L) - \sqrt{(R+\Delta R)^2 + z_0^2 + (W+L)^2}}\right| --$$
$$\frac{(W+L)}{2}\text{Ln}\left|\frac{(W+L) + \sqrt{R^2 + z_0^2 + (W+L)^2}}{(W+L) - \sqrt{R^2 + z_0^2 + (W+L)^2}}\right| --$$
$$\sqrt{(R+\Delta R)^2 + z_0^2 + (W+\Delta W - L)^2} +$$
$$\sqrt{(R)^2 + z_0^2 + (W+\Delta W - L)^2} ++ \frac{(W+\Delta W - L)}{2}\text{Ln}$$
$$\left|\frac{(W+\Delta W - L) + \sqrt{(R+\Delta R)^2 + z_0^2 + (W+\Delta W - L)^2}}{(W+\Delta W - L) - \sqrt{(R+\Delta R)^2 + z_0^2 + (W+\Delta W - L)^2}}\right| --$$
$$\frac{(W+\Delta W - L)}{2}\text{Ln}$$
$$\left|\frac{(W+\Delta W - L) + \sqrt{R^2 + z_0^2 + (W+\Delta W - L)^2}}{(W+\Delta W - L) - \sqrt{R^2 + z_0^2 + (W+\Delta W - L)^2}}\right| ++$$
$$\sqrt{(R+\Delta R)^2 + z_0^2 + (W-L)^2} +$$
$$\sqrt{(R)^2 + z_0^2 + (W-L)^2} -- \frac{(W-L)}{2}\text{Ln}$$
$$\left|\frac{(W-L) + \sqrt{(R+\Delta R)^2 + z_0^2 + (W-L)^2}}{(W-L) - \sqrt{(R+\Delta R)^2 + z_0^2 + (W-L)^2}}\right| ++$$
$$\left.\frac{(W-L)}{2}\text{Ln}\left|\frac{(W-L) + \sqrt{R^2 + z_0^2 + (W-L)^2}}{(W+L) - \sqrt{R^2 + z_0^2 + (W-L)^2}}\right|\right\}$$

Equation (16) was derived under an assumption that the magnetic flux created by the transponder itself has trivial effect on the magnetic field of the antenna.

Figure 5:
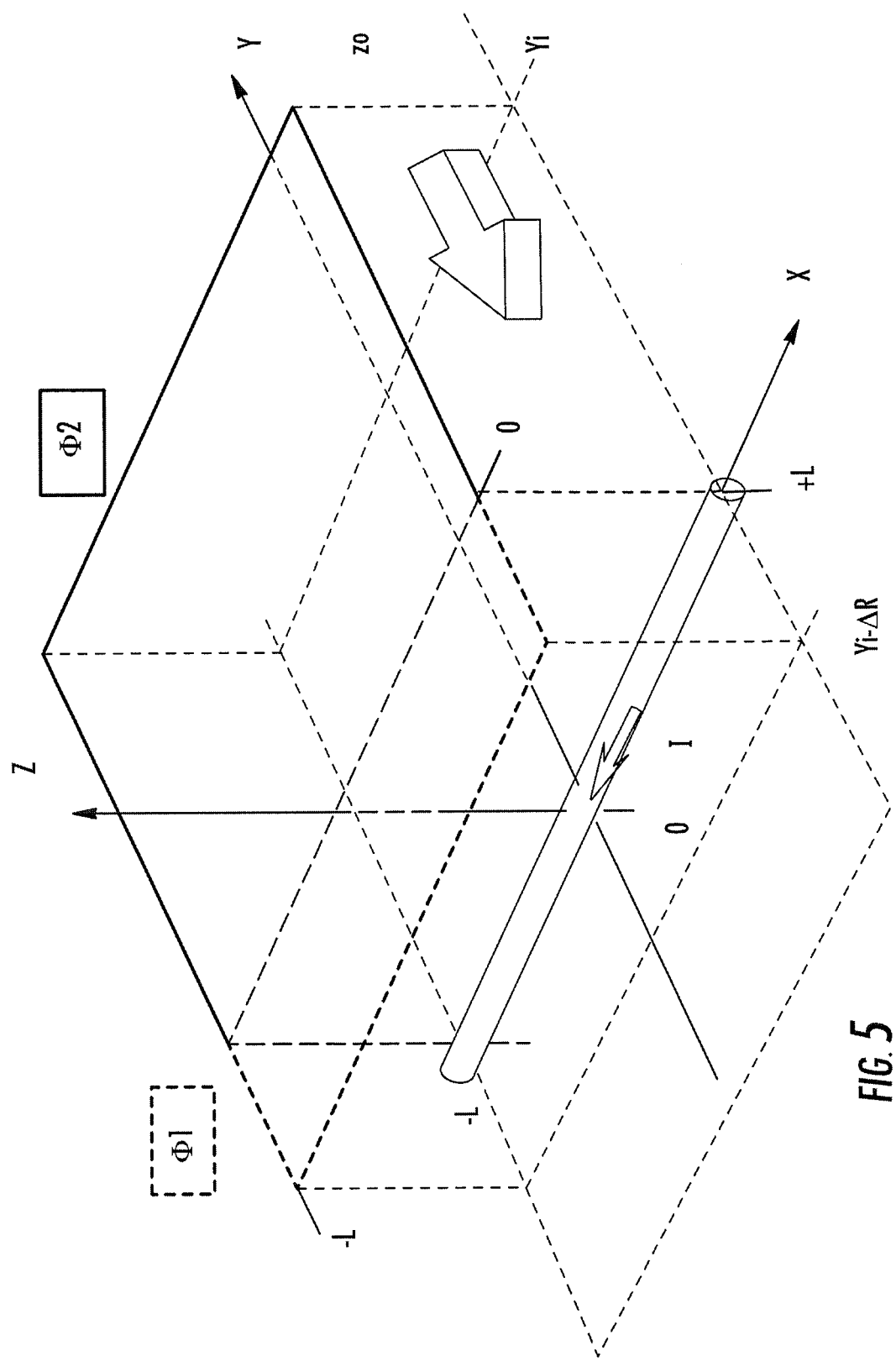
FIG. 5 illustrates the magnetic flux density and transponder of FIG. 4, wherein the transponder is represented by two parts.

Transponder magnetic flux for the interval where $$-\frac{\Delta R}{2} \le Y \le 0 \qquad (17)$$

may be reconstructed from (16) representing transponder by two parts, as illustrated in FIG. 5, having a total length ΔR with limits for the first one $Y_i-\Delta R$ by ΔW and the second one $Y_i$ by ΔW. By setting R=0 and making $\Delta R_i$ variable in (16) the sum of magnetic flux $\Phi_1$ and $\Phi_2$ on interval (17) can be calculated considering their opposite directions.

An equation (16) for the magnetic flux through transponder includes and relates an antenna length, distance to a transponder, its coil dimensions and number of turns, and also indirectly considers an RF power available from a Reader by counting a current I.

Antenna-Transponder Interaction

Embodiments may include one or two antenna to transponder alignments. In particular, each alignment is relative to types of transponder movement direction. The two movements are referred to as "crosswise" and "lateral" and describe a transponder orientation in regards to an antenna plane. To facilitate an antenna-transponder interaction analysis and comparison a simple but "strictly speaking" quite adequate for both cases mathematical model (16) may be used.

Figure 6:
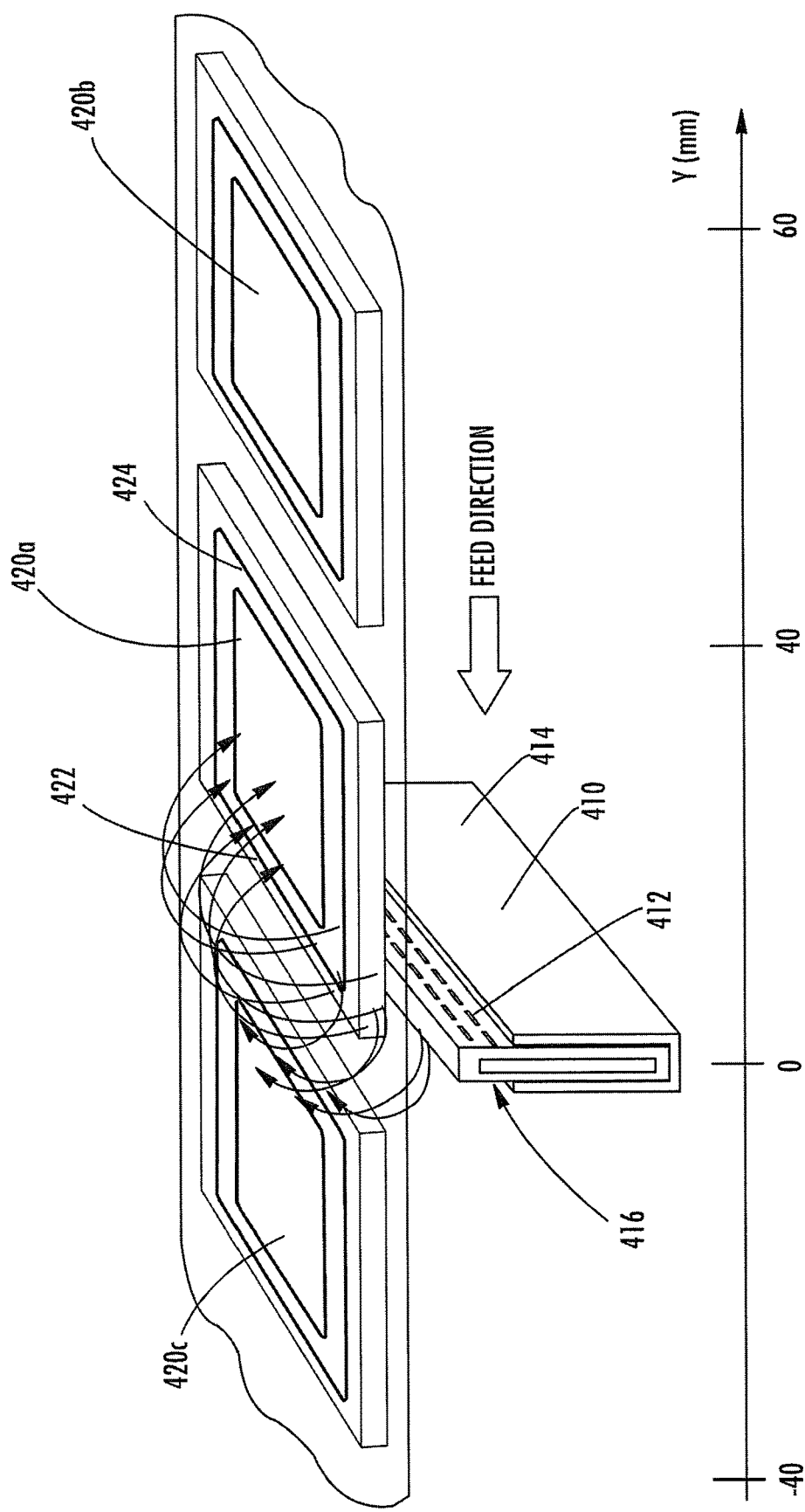
FIG. 6 illustrates a first antenna to transponder alignment.
Figure 7:
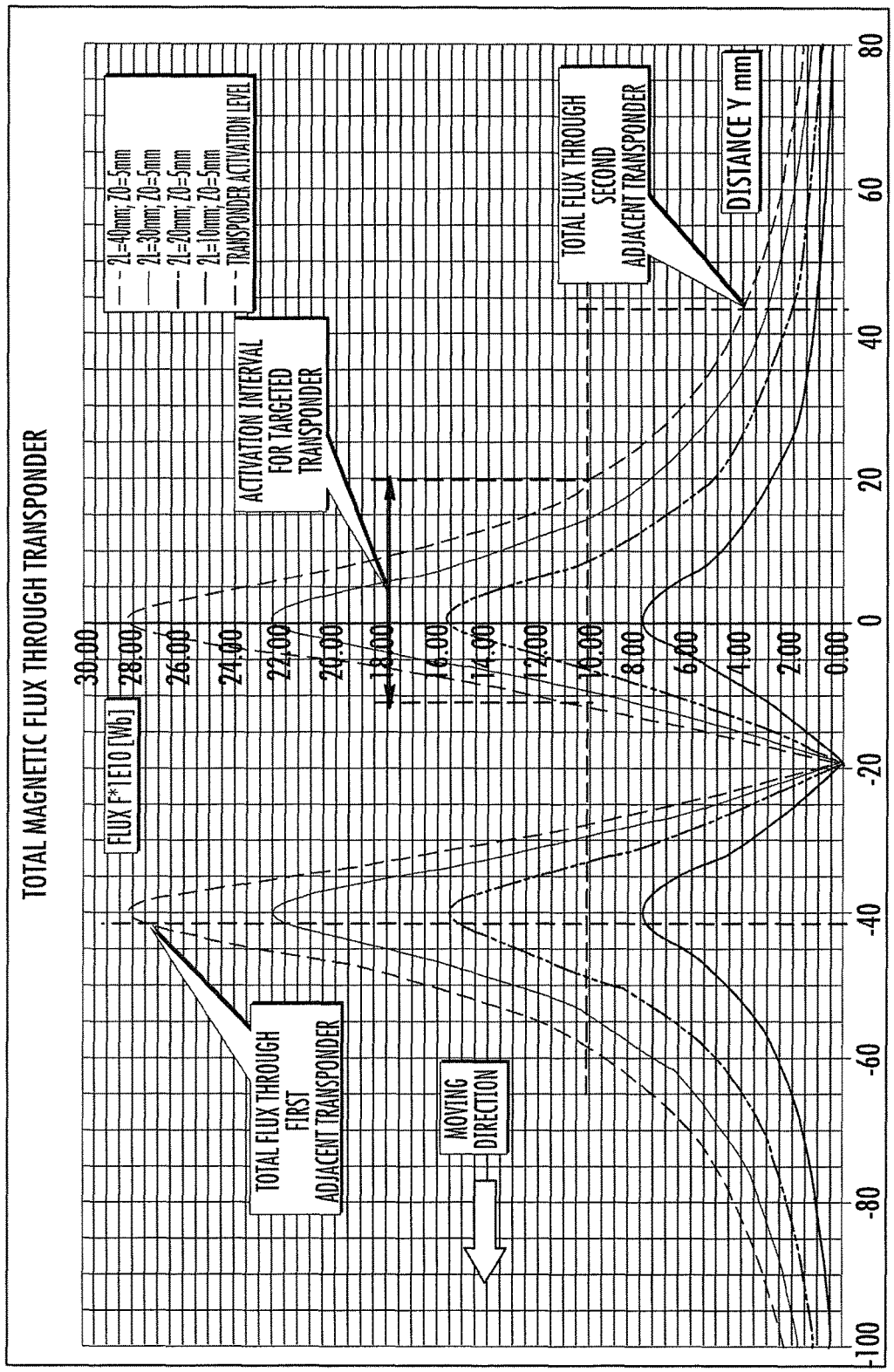
FIG. 7 graphs the total magnetic flux through the transponders of FIG. 6.

To estimate an antenna SS for a transponder crosswise movement as illustrated in FIG. 6 (as well as FIG. 4) the total transponder flux from an antenna 410 carrying, for example, 80 mA current with 3 turns coil, may be calculated and plotted, as illustrated in FIG. 7, for the antenna 410 location Y=0. For this example, four antennas were analyzed having a length that ranges from 10 to 40 mm and the distance (i.e., the geometry mean distance) between an antenna wires (or traces) and transponder plane $Z_0$ was approximately 5 mm. The magnetic flux was calculated for a transponder at different positions having a size and shape of 40 mm by 40 mm and a 1 nWb activation flux. Although for a 40 mm length antenna a flux curve sharply changes and for a second adjacent transponder 420b, an antenna has SS approximately 8 dB, an interaction interval has two separated parts. For the first adjacent transponder 420c (as shown in FIG. 7) that is approximately 40 mm apart from targeted transponder 420a, SS of this antenna for this specific position (i.e., the current location of first adjacent transponder 420c) is negative (−8.5 dB). The total magnetic flux through the first adjacent transponder exceeds its activation level thus creating a collision situation, i.e., the targeted transponder 420a and the first adjacent transponder 420c have overlapping activation intervals. While an activation interval for a targeted transponder is only 30 mm, an antenna for such alignment can be used successfully for small item-level RFID only if first adjacent transponder is moving out from conveyor belt after being encoded.

Figure 8:
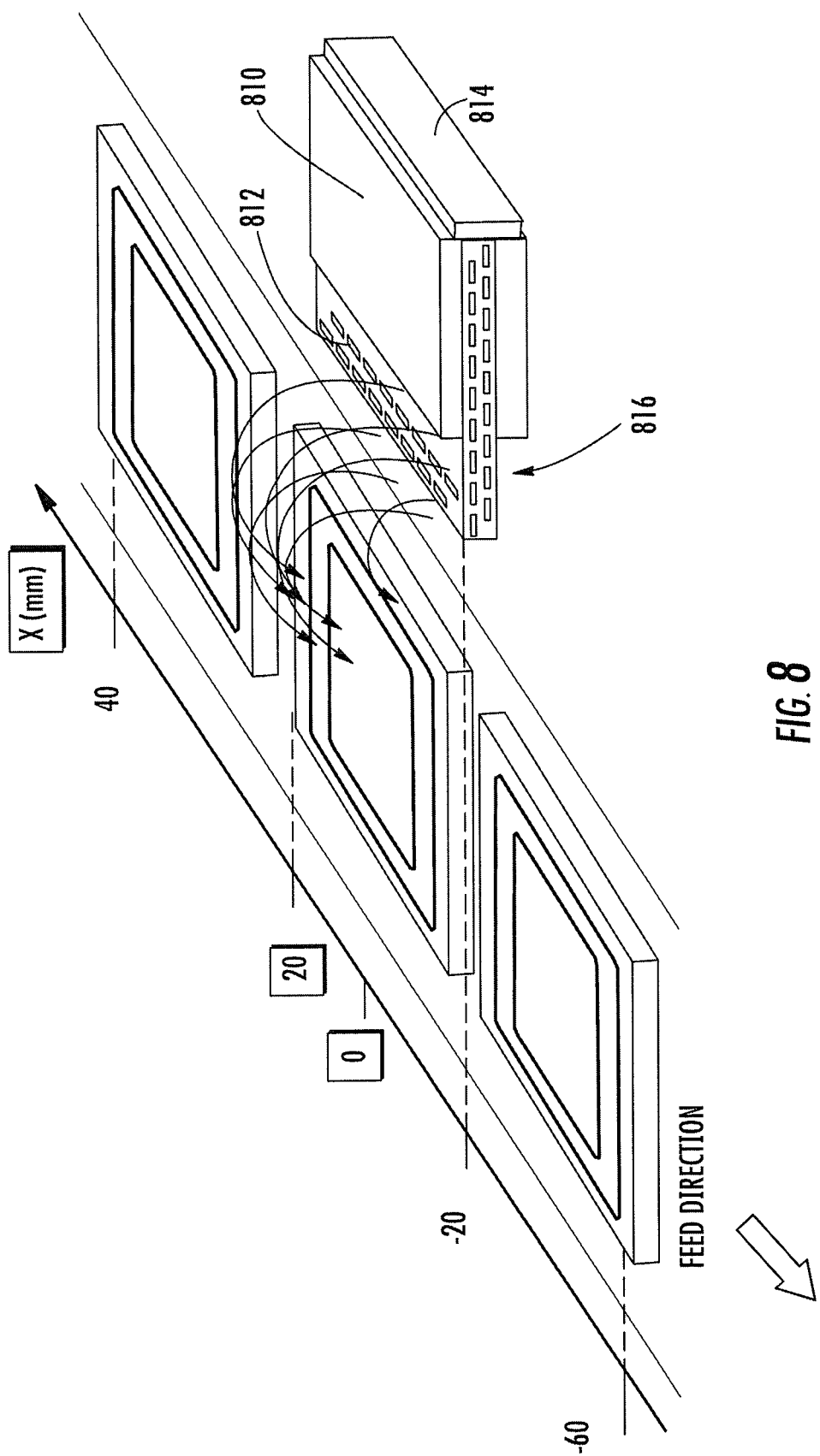
FIG. 8 illustrates a second antenna to transponder alignment consistent with an exemplary embodiment.
Figure 9:
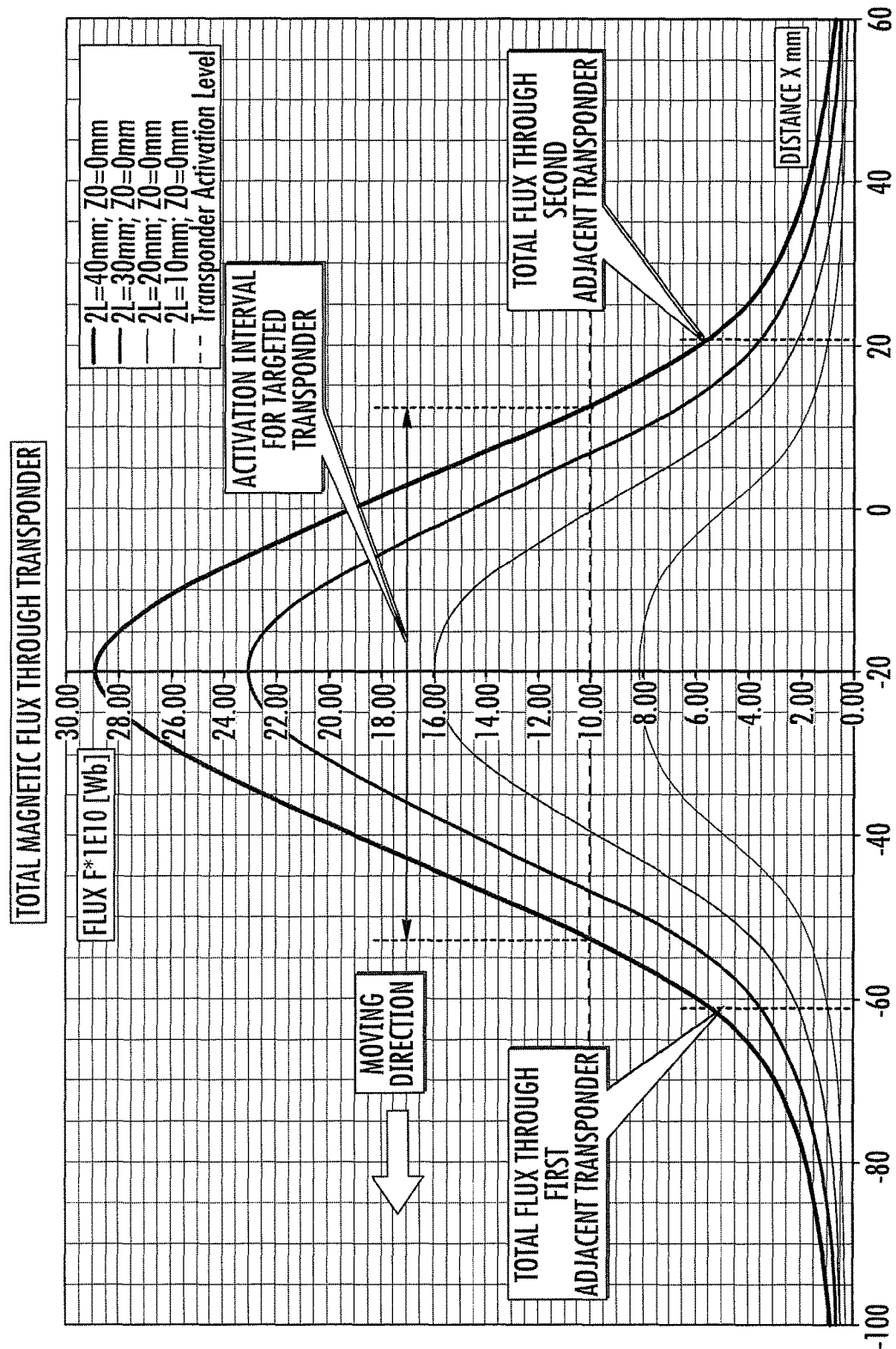
FIG. 9 graphs the total magnetic flux through the transponders of FIG. 8.

For a transponder lateral movement and corresponding alignment shown in FIGS. 4 and 8, a curve of the total flux through a transponder is not as sharp as for the crosswise alignment but instead there is a single, relatively wide, interaction interval as illustrated in FIG. 9. The same four antennas with a length ranging from 10 to 40 mm were analyzed for their positions with a co-centered alignment being at X=0. The distance between an antenna wire and transponder edge (i.e., the geometry mean distance) R=5 mm and separation $Z_0$=0. The magnetic flux was calculated for the similar transponder as used for the crosswise analysis. For 40 mm antenna length its SS is approximately 4.5 dB for both adjacent transponders and the activation interval for targeted transponder is approximately 65 mm. The flux or power margin exceeds 9 dB which makes the interrogation process reliable. For antennas centered at X=0 with length decreasing from 40 to 30 and 20 mm, the activation intervals shrink from 65 mm to 55 and 38 mm respectively and a relative activation flux or power changes proportionally from 9 dB to 7 and 4 dB. The antenna with 10 mm length was unable to activate a transponder. The advantages of the lateral alignment compared to the crosswise alignment appear to be a wider activation interval and a higher spatial selectivity and RF power margin.

Figure 10:
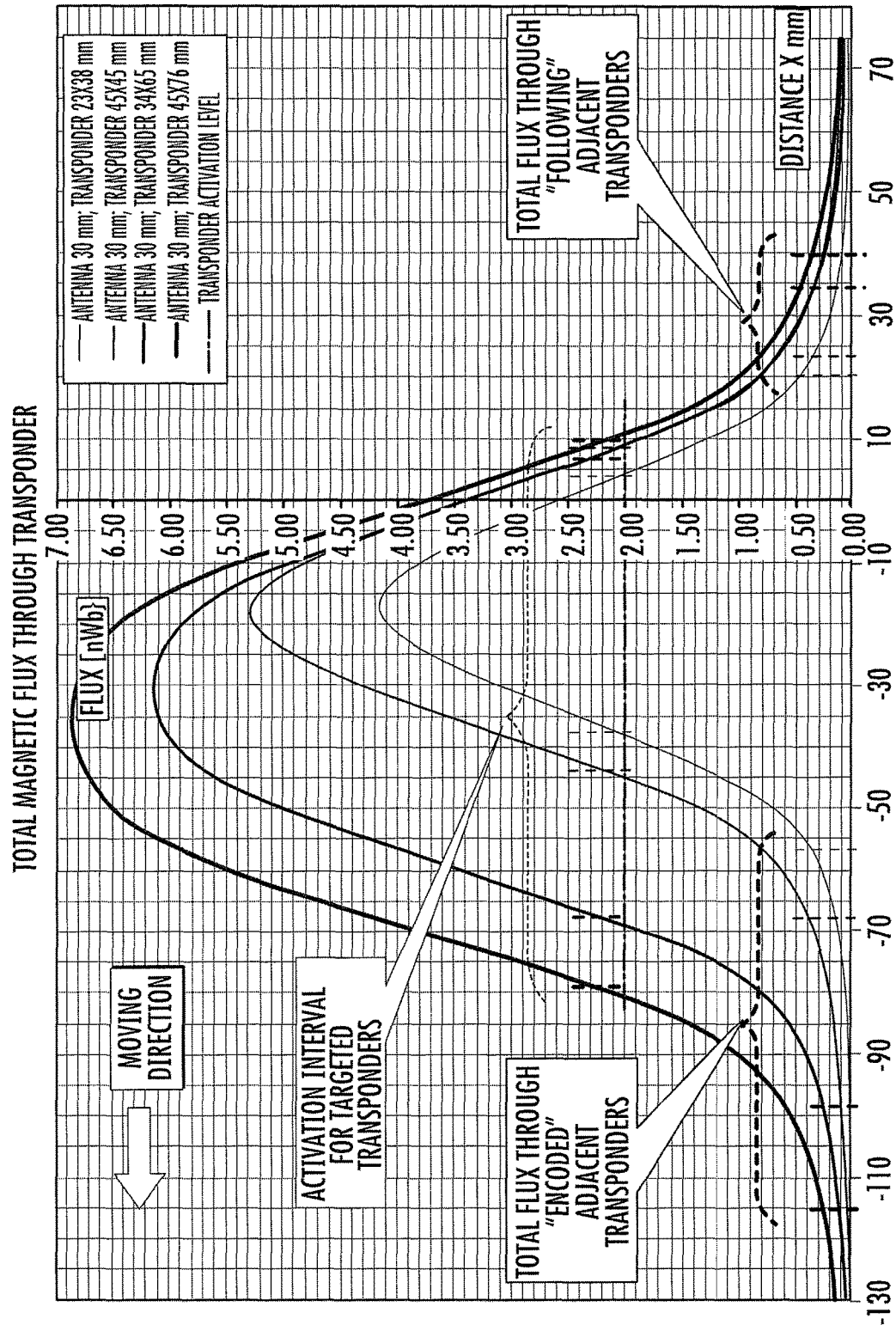
FIG. 10 graphs the total magnetic flux through four different transponder according to an alignment consistent with FIG. 8.

FIG. 10 illustrates total magnetic flux curves for four transponders consistent with a lateral movement and spaced 5 mm apart from the antenna having 3 wires, 200 mA current and 30 mm length and centered at X=0. With average transponder activation flux approximately 2 nWb, the antenna demonstrates high spatial selectivity for all transponders in wide dimensional range as illustrated below in Table 1. A maximum relative activation flux was calculated for each transponder co-centered with the antenna, also illustrated in Table 1.

TABLE 1

| Transponder dimensions (mm) | SS for an "encoded" transponder (dB) | SS for a "following" transponder (dB) | Maximum Relative Activation Flux (dB) |
|---|---|---|---|
| 23 × 38 | 15.4 | 12 | 6.3 |
| 45 × 45 | 14.2 | 8.9 | 8.4 |
| 34 × 65 | 17.4 | 15 | 9.7 |
| 45 × 76 | 16.8 | 14.7 | 10.6 |

Antenna Circuit

The magnetic flux produced by an antenna will intersect the wires of the transponder and create current flow. The induced current flow in transponder will have its own magnetic flux which will interact with the magnetic flux of an antenna. At some point current induced in an antenna circuit by the transponder flux may become comparable with an antenna current and change its impedance and magnetic flux consequently. Thus a current flowing in the antenna (e.g., its coil structure) may be defined by RF power from a reader and impedance that depends on properties of both magnetically coupled resonant circuits.

To find a complete description of the current in the antenna, it may be necessary to know parameters that characterize a relationship between the geometric structure of an antenna-transponder and their electrical components. The first parameter called the mutual inductance M relates two nearby coils (e.g., the coil structure of the antenna and the coil structure of the transponder) of magnetically coupled devices. The mutual inductance depends on the geometrical arrangement of both circuits. The parameter M can be obtained from (16) and expressed as $$M = \frac{\Phi_T}{I} [H] \tag{18}$$

Then impedance $Z_{AT}$ induced in antenna circuit by transponder circuit may be written as $$Z_{AT} = \frac{(2\pi fM)^2 R_{TS}}{R_{TS}^2 + X_T^2} - j\frac{(2\pi fM)^2 X_T}{R_{TS}^2 + X_T^2} \tag{19}$$

where: $R_{TS}$—equivalent resistive component of transponder impedance; and $X_T$—equivalent reactive component of transponder impedance.

If both antenna and transponder circuits are tuned at resonance with $X_T=0$ the equation (19) becomes $$R_{AT} = \frac{(2\pi fM)^2}{R_T} [Ohm] \qquad (20)$$

where $R_{AT}$—a resistive component induced in antenna by a transponder. Thus antenna impedance at resonance consists of its equivalent resistance $R_{AL}$ associated with circuit losses in series with resistance $R_{AT}$ (20).

The second parameter called the coupling coefficient K is the ratio showing a grade of coupling between two devices and defined as $$K = \frac{M}{\sqrt{L_A L_T}} \qquad (21)$$

where: $L_A$—appeared inductance of an antenna coil; and $L_T$—inductance of a transponder coil.

The magnetic flux through transponder's coil is increasing when it comes close to an antenna and so does the coupling coefficient. At some separation distance an antenna-transponder coupling attains critical level at which power transfer efficiency from antenna to transponder achieves its maximum and $R_{AL}$ becomes equal to $R_{AT}$. Then the third parameter called the critical coupling coefficient $K_c$ linking Q-factors of both circuits for this case $$K_c = \frac{1}{\sqrt{Q_A Q_T}} \qquad (22)$$

A required for critical coupling an appeared inductance $L_A$ of antenna coil can be obtained by combining (18), (21) and (22).

$$L_A = \frac{\Phi_T}{I\sqrt{\frac{L_T^2}{Q_A Q_T}}}$$

In order to maintain the same transponder magnetic flux for the critical coupling as for loosely coupled case an RF power from a reader must be doubled and antenna impedance matched to $2R_{AL}$.

Matching an antenna combined impedance when critical coupling takes place for a transponder positioned at the center of an activation interval further increases an antenna's SS. Improved SS is achieved because transponder location at the activation interval edges causes an antenna impedance mismatch. The impedance mismatch in turn decreases the power transfer efficiency and as a result lowers the magnetic flux available for adjacent transponders. If a design goal is to enlarge an activation interval then an adaptive impedance matching might be implemented. The antenna impedance adaptive matching uses adjustable matching components which parameters changes depending on an antenna coupling grade with a transponder to keep antenna port impedance equal to impedance of RF power source.

Antenna coil practical design is a multi-interactive process but regardless of selected type of fabrication technology an appeared inductance can be measured and confirmed after covering tree sides of a rectangular coil by flexible ferrite with permeability approximately 20-40. Utilization of ferrite materials with higher permeability is limited by the total minimum value of antenna resonating capacitive elements that should be no less then 50 pF to degrade circuit susceptibility to detuning environmental impact.

Design Considerations

A single element antenna allows for precise identification of closely spaced miniature objects with a wide range of transponder geometries. This spatially selective antenna and the mathematical model developed for its analysis are not restricted in size and may be successfully applied to widespread RFID applications involving large-scale structures. One limitation of a highly spatially selective antenna is that despite its proximity to the transponder, the antenna requires the same RF power as a conventional antenna for long range RFID applications. This limitation may apply only to HF transponders activated by the antenna's magnetic field, whereas battery powered transponders require significantly less power for the antenna. For conveyor-type RFID applications, in crowded environments with surrounding metal and plastic parts, the magnetic field becomes distorted. Such environments increase power losses, detune the antenna and the transponder, and require higher power for transponder activation compared to the open environments. Nonetheless, the antenna-transponder coupling may be analyzed as described above and exemplary embodiments of RFID systems, for example, HF RFID printer-encoders, may benefit from the teachings of such an analysis.

Other considerations are further discussed in UHF RFID Antennas for Printer-Encoders-Part 1: System Requirements", High Frequency Electronics, Vol. 6, No. 9, September 2007, pp. 28-39 (http://www.highfrequencyelectronics.com/Archives/Sep07/0907_Tsirline.pdf); "UHF RFID Antennas for Printer-Encoders-Part 2: Antenna Types", High Frequency Electronics, Vol. 6, No. 10, October 2007, pp. 36-45 (http://www.highfrequencyelectronics.com/Archives/Oct07/HFE1007 Tsirline.pdf); and "UHF RFID Antennas for Printer-Encoders-Part 3: Mobile Equipment", High Frequency Electronics, Vol. 6, No. 11, November 2007, pp. 18-25 (http://www.highfrequencyelectronics.com/Nov2007/HFE1107_OE.pdf). Each of which were authored by a common inventor of the present application and each of which are hereby incorporated by reference in its entirety.

Exemplary Embodiments

Exemplary embodiments relate to item-level HF RFID applications and antennas for such applications. One or more of the embodiments incorporate the teachings of the analysis and discussion provided above regarding the possible alignments between an antenna and transponders. Although the antenna to transponder alignments discussed herein primarily referred to a HF magnetically-coupled RFID system, the benefits of such alignments may also be applicable to other systems such as an UHF electro-magnetically coupled near field system (i.e., a system with an antenna based on a transmission line for coupling with a transponder in close proximity to the antenna). As a more specific example, the disclosed alignment is applicable to UHF near-field coupler-transponder (at least for a transponder having a dipole type antenna) alignments.

Embodiments of the present invention concern an apparatus for enabling an RFID transceiver (also referred to as a "reader") to selectively communicate with a targeted transponder that is commingled among or positioned in proximity to multiple adjacent transponders. As will be apparent to one of ordinary skill in the art, various embodiments of the present invention are described below that selectively communicate with a targeted transponder requiring little to no electro-magnetic isolation of the transponder through the use space-consuming shielded housings, anechoic chambers, or relatively more complex or costly collision management techniques.

Several embodiments of the present invention may be useful for reading, writing, or otherwise encoding passive or active transponders attached to items located on assembly lines, in inventory management centers where on-demand RFID labeling may be needed, or in other similar circumstances, where the transponders are in close proximity to each other. In various embodiments, one or more transponders are mounted to or embedded within a label, ticket, card, or other media form that may be carried on a liner or carrier. In alternate linerless embodiments, a liner or carrier may not be needed. Such RFID enabled labels, tickets, tags, and other media forms are referred to collectively herein as "media units." As will be apparent to one of ordinary skill in the art, it may be desirable to print indicia such as text, numbers; barcodes, graphics, etc., to such media units before, after, or during communications with their corresponding transponders.

FIG. 1 provides an example of an environment that may employ one or more of the embodiments of the present invention. In this example, a RFID enabled system 100 includes a conveyance means 110 for moving a series of items with transponders 122 along a predetermined path. More specifically, in this example, the conveyance means 110 may be a conveyor belt or other platform for transporting a series of medicine containers 120 along a path from an upstream location to a downstream location. Each medicine container 120 has a transponder 122. For example, the transponder may be part of a label that is adhered to a surface of the medicine container. The RFID system may include a reading or encoding station 130 in which either information is read from the transponders 122 or information is stored in the transponders 122 as the transponders 122 pass through the reading or encoding station 130. The reading or encoding station 130 may include a high frequency ("HF")(e.g., 3 MHz-30 MHz) antenna based on a resonant inductor (e.g., a planer spiral coil fabricated on a printed circuit board ("PCB")) partially covered by a ferrite patch (or other shielding element) leaving one side of the coil exposed. FIG. 1 illustrates a particular HF magnetic antenna to transponder alignment for items identification on a conveyor system.

As another example of an RFID system that may benefit from one or more of the embodiments are RFID enabled printer systems, also referred to herein as "printer-encoders." Examples of printer-encoders are disclosed in commonly-owned U.S. Pat. Nos. 6,481,907 and 6,848,616, which are hereby incorporated herein by reference.

Figure 11:
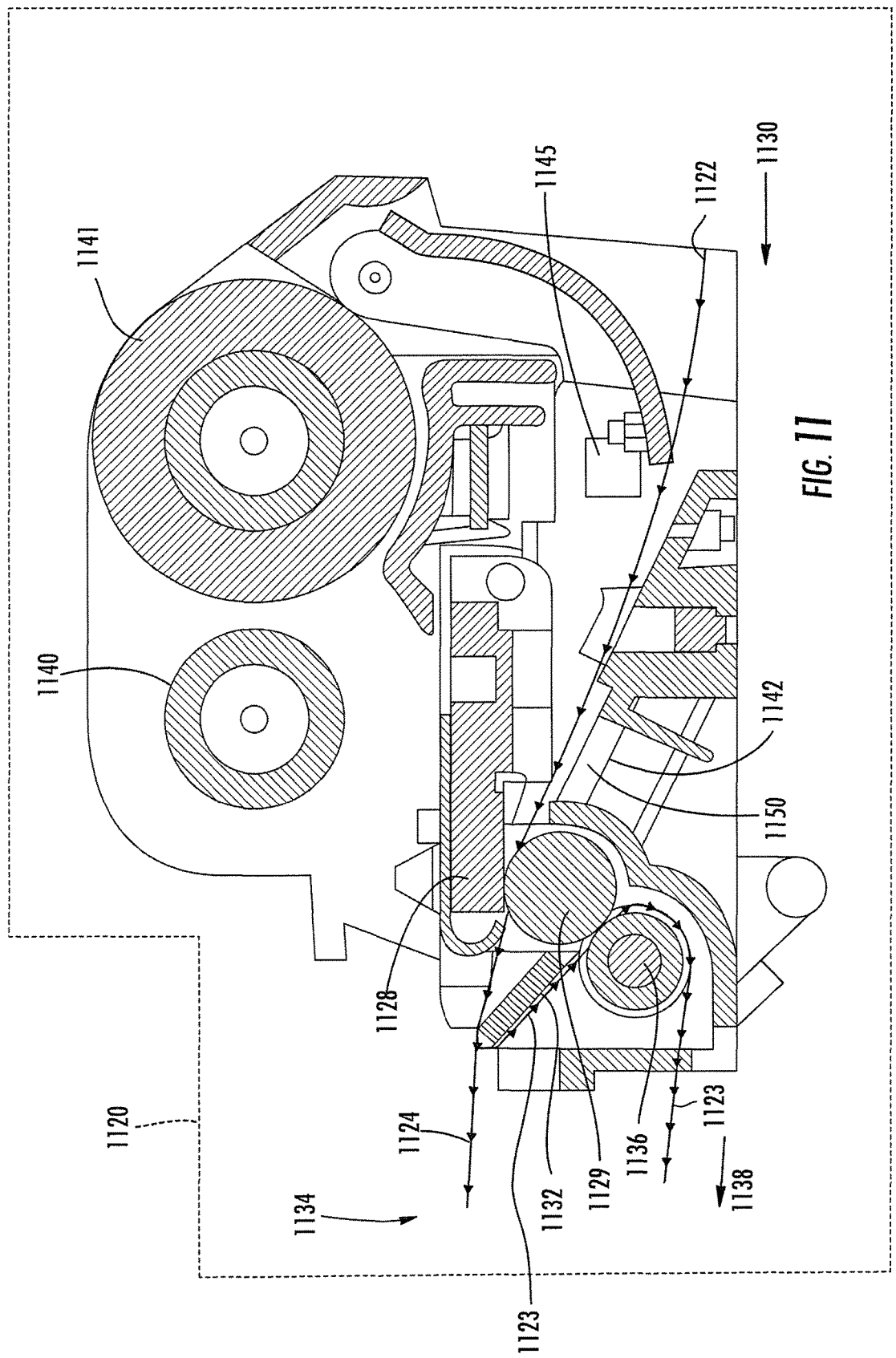
FIG. 11 illustrates a printer-encoder consistent with an exemplary embodiment.

FIG. 11 illustrates an example of a RFID printer-encoder 1120 structured for printing and programming a series or stream of media units 1124. The printer-encoder 1120 includes several components, such as a printhead 1128, a platen roller 1129, a feed path 1130, a peeler bar 1132, a media exit path 1134, rollers 1136, a carrier exit path 1138, a take-up spool 1140, a ribbon supply roll 1141, a transceiver 1142, a controller 1145, and a HF magnetic antenna 1150.

As noted above, media units may include labels, cards, etc, that are carried by a substrate liner or web 1122. The web 1122 is directed along the feed path 1130 and between the printhead 1128 and the platen roller 1129 for printing indicia onto the media units 1124. The ribbon supply roll 1141 provides a thermal ribbon (not shown for clarity) that extends along a path such that a portion of the ribbon is positioned between the printhead 1128 and the media units 1124. The printhead 1128 heats up and presses a portion of the ribbon onto the media units 1124 to print indicia. The take-up spool 1140 is configured to receive and spool the used ribbon. This printing technique is commonly referred to as a thermal transfer printing. However, several other printing techniques may be used including, but not limited to, direct thermal printing, inkjet printing, dot matrix printing, and electro-photographic printing.

After printing, the media unit web 1122 proceeds to the media exit path 1134 where the media units are typically individually removed from the web 1122. For example, in one embodiment, pre-cut media units 1124 may be simply peeled from the web 1122 using the peeler bar 1132 as shown. In other embodiments, a group of multiple media units may be peeled together and transmitted downstream to an in-line cutter for subsequent separation (not shown). Various other known media unit removal techniques may be used as will be apparent to one of ordinary skill in the art.

In applications, such as the depicted embodiment, in which the media units 1124 are supported by a web 1122, the web 1122 may be guided along a path toward the carrier exit path 1138 by rollers 1136 or other devices once being separated from the media units. Techniques and structures for conveying or guiding the web of media units along the entire feed path of the printer-encoder are generally referred to as conveyance systems.

The transceiver 1142 is configured for generating and transmitting RF communication signals that are broadcasted by the HF magnetic antenna 1150 located proximate the media feed path 1130. For purposes of the present specification, the transceiver 1142 and the antenna 1150 may be referred to collectively as forming at least part of a communication system. The communication system forms a magnetic flux in the location of a transponder encoding area for establishing, at predetermined transceiver power levels, a mutual coupling between the antenna of the transceiver and a targeted transponder of a media unit that is located in the transponder encoding area, such that data may be read from and written to transponder.

In general, the transceiver or reader is a device configured to generate, process, and receive electrical communication signals. One in the art would appreciate that similar devices such as transmitters, receivers, or transmitter-receivers may be used within this invention. "Transceiver" as used in the present application and the appended claims refers to the devices noted above and to any device capable of generating, processing, or receiving electrical and/or electromagnetic signals. For example, a transceiver may be a combination of a receiver and a transmitter.

In some application, such as portable and compact systems, the antenna may be near or approximate with the print head. For example, the antenna may be close enough to the print head that at least a part of the encoding area overlaps the print head, which may allow the system to encode the shortest possible labels or maintain the shortest pitch between labels. In other words, the system may be configured such that the system is printing indicia onto the media unit while it is interrogating or encoding the transponder of the media unit. The close proximity of the antenna and print head may be necessary or desirable in order to maintain overall compact design of the system And it may also create a situation in which the interrogation or encoding of a transponder occurs in essentially the same space as any printing operations. In such applications, once the transponder is encoded, the next position for it may be outside the system. For example, FIG. 6 illustrates a HF antenna that may be used within a printer-encoder. In this example, a first transponder 420c having been encoded is moved downstream by one position from the encoding region. Due to the compactness of the printer-encoder of this example, this places the first transponder 420c outside the printer-encoder, which may make the first transponder 420c more sensitive to magnetic flux. A second transponder 420b of FIG. 6 is positioned for encoding and a third transponder 420b of FIG. 3 is upstream of the second transponder 420a positioned to move into the encoding region after the second transponder 420a. Other than the antenna, the rest of the printer encoder is not illustrated in FIG. 6 in order to better illustrate the spatial relationship between the antenna and the transponders.

FIG. 6 illustrates a first antenna to transponder alignment in which the antenna is generally perpendicular to the direction of travel of the transponder (also referred to as a "feed direction"), which is referred to as "crosswise movement" above. In this alignment, the coil trace or traces 412 on the exposed portion of the resonant inductor 416 (i.e., the portion not enclosed by the shielding element 414) extend generally perpendicular to the feed direction. A coil trace having a flow of electrons or current within it may be expected to emit a magnetic flux lines in a generally toroidal pattern about the coil trace. Therefore as illustrated in FIG. 6, in the first antenna to transponder alignment, the magnetic flux lines emit in a generally toroidal pattern along the feed direction such that at least a portion of the flux lines extend toward the exit of the printer-encoder.

The first antenna to transponder alignment has a relative high spatial selectivity allowing or a narrow single encoding area, i.e., the transponder encoding area, inside the printer-encoder. However, the first antenna to transponder alignment creates a communication gap within the encoding region as explained in more detail above. In general, at one point (approximately when the transponder is centered on the antenna) the magnetic flux from the antenna 410 induces a current flowing in a first direction in the wire (i.e., the antenna of the transponder) along a leading edge 422 of the second transponder 420a while induces a current following in a second direction counter the first direction in the wire on a trailing edge 424 of the second transponder 420a. The inducement of counter currents on opposite sides of the transponder's antenna significantly decreases the total magnetic flux via the transponder and generally creates a gap in communication with the transponder even though the transponder is within the encoding region.

Moreover, after a transponder is encoded and moved to one adjacent position downstream from the encoding region, such as the first transponder 420c of FIG. 6, the trailing edge (i.e., the end nearest the encoding region) may still be close enough to the encoding region to collect a fringing magnetic flux of the antenna. The issue may be exacerbated when the antenna is part of a system such as a printer-encoder.

Figure 12:
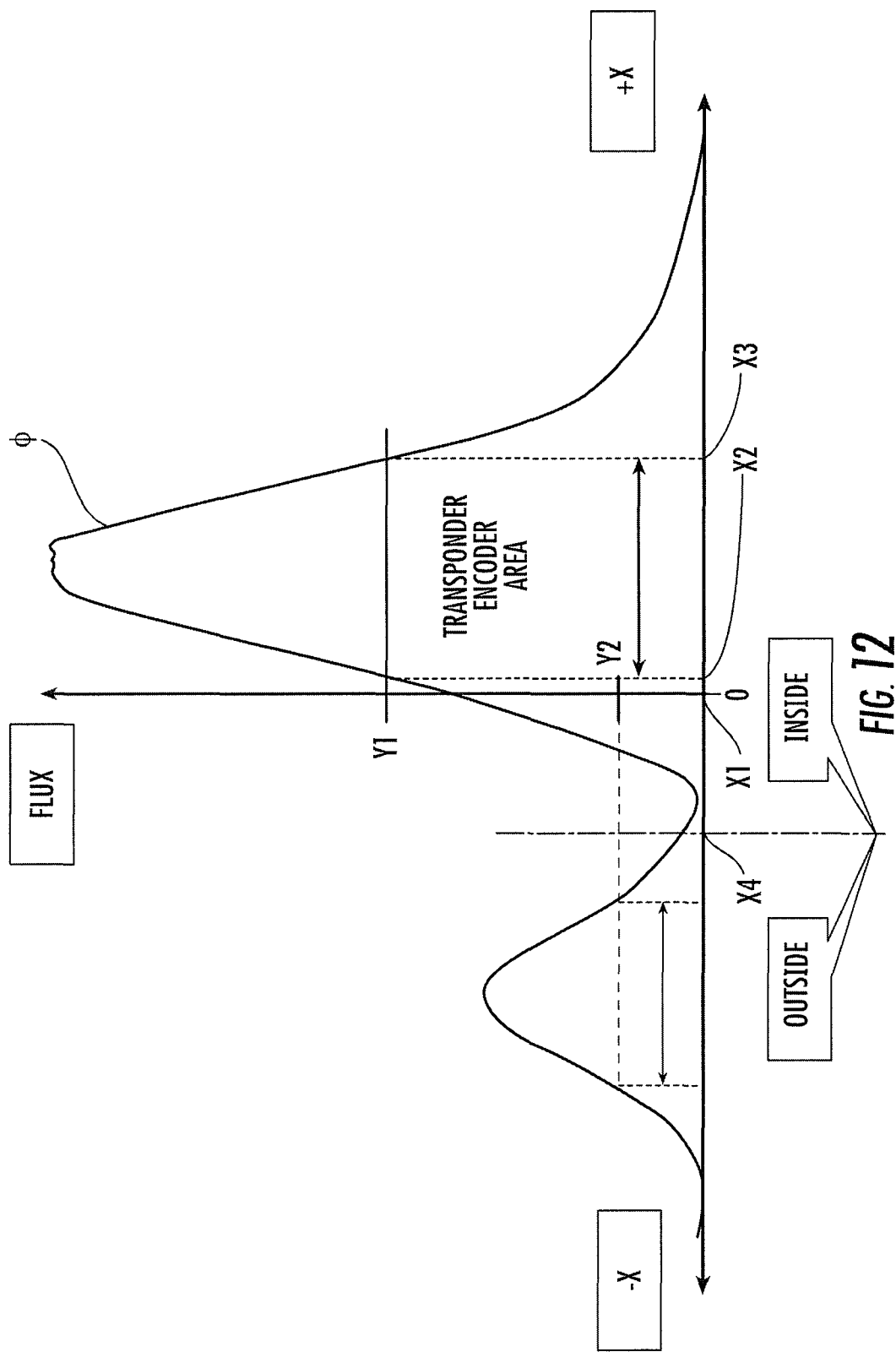
FIG. 12 graphs the total magnetic flux through a transponder consistent with the alignment of FIG. 6.

For example and referring to the graph of FIG. 12, the horizontal line X represents the position of the transponder to the antenna. For example at X=0 (designated by "X1" in FIG. 12), the leading edge of transponder is substantially aligned with the antenna. As explained above, the antenna is configured to generate a magnetic flux (designated by "Φ" in FIG. 12) for coupling with the transponder. As indicated by the graph of FIG. 12, the strength of the magnetic flux varies as a function of distance to the antenna and the environment (e.g., inside or outside the printer-encoder). The magnetic flux is configured to be concentrated in the transponder encoding area (i.e., between X2 and X3). The strength of the magnetic flux is intended to be equal or greater in the transponder encoding area than a minimum level of magnetic flux required to active the transponder for communication (referred to herein as the transponder activation flux ("TAF")).

At a certain point after the transponder has passed the antenna, the transponder will also exit the printer-encoder, referred to as the exit point (designated by X4 in FIG. 12). The exit point relative to the antenna position may vary. However, as explained above, in many embodiments, such as mobile or compact system, the distance between the exit point and the antenna position may be relatively small, e.g., less than a length of the media unit. Inside the printer-encoder, a transponder has a relatively high TAF (designated by Y1 in FIG. 12) because the transponder is surrounded by many dielectric and metal components of the printer-encoder that may cause the transponder to become at least partially detuned or create a loss between the transponder and the antenna. But the TAF of a transponder located outside the printer-encoder (designated by Y2 in FIG. 12) is lower and fringing magnetic flux of the antenna may exceed the TAF of the antenna outside the printer-encoder. As a result even a relatively weak magnetic flux leaking outside the printer encoder may be sufficient to activate an already encoded transponder again and create a collision error as illustrated in FIG. 12.

Figure 13:
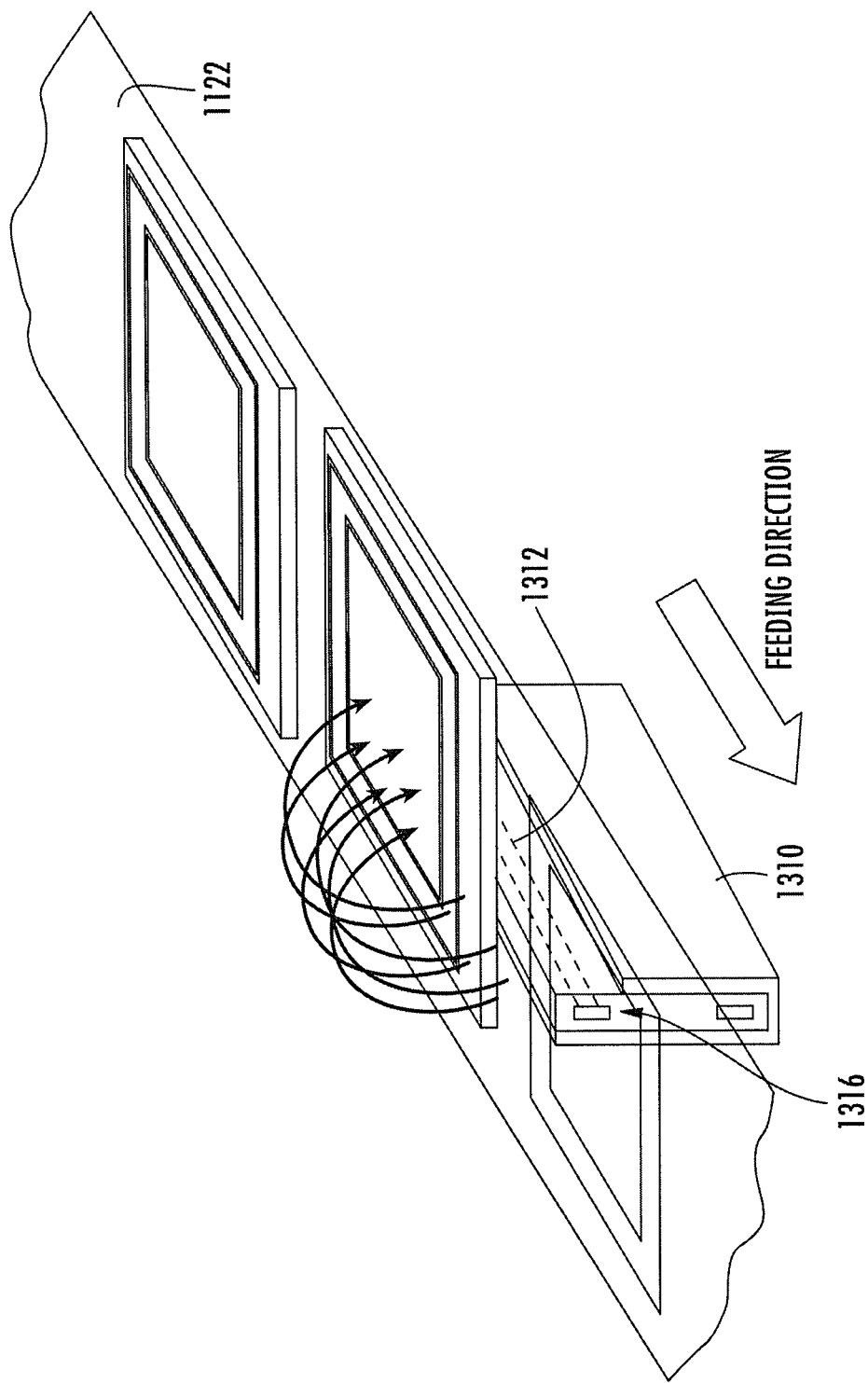
FIG. 13 illustrates the second antenna to transponder alignment consistent with another embodiment.

FIGS. 8 and 13 illustrate a second antenna to transponder alignment (also referred to as the second alignment of an antenna-transponder) according to an embodiment of the present invention. In the second antenna to transponder alignment, the antenna 810, 1310 is generally parallel to the feed direction, which is referred to as lateral movement above. In this alignment, the coil trace or traces 812, 1312 on the exposed portion 816, 1316 of the resonant inductor side (i.e., the portion not enclosed by the shielding element 814, 1314) extend generally parallel to the feed direction. As illustrated with the arrow lines in the figures that represent magnetic flux lines, because the open or exposed coil traces 812, 1312 extend generally parallel to the feed direction, the magnetic flux lines emit from the antenna 810, 1310 are perpendicular with the feed direction (i.e., the flux lines do not extend along the feed direction), which minimizes the likelihood of magnetic flux leaking outside the printer-encoder compared to the first antenna to transponder alignment.

In some embodiments, it may be preferable to configure the printer encoder as a side-justified system. In a side-justified system, regardless of the width of the label the transponder is placed at the same side or portion of the label that passes nearest the antenna. Such an arrangement may allow for a minimal power level and encoding area. Also, unlike the first antenna to transponder, the antenna may be positioned such that at no point during the transponder encoding region is the transponder centered on the antenna and, thus, eliminates the communication gap found in the first alignment.

Figure 14:
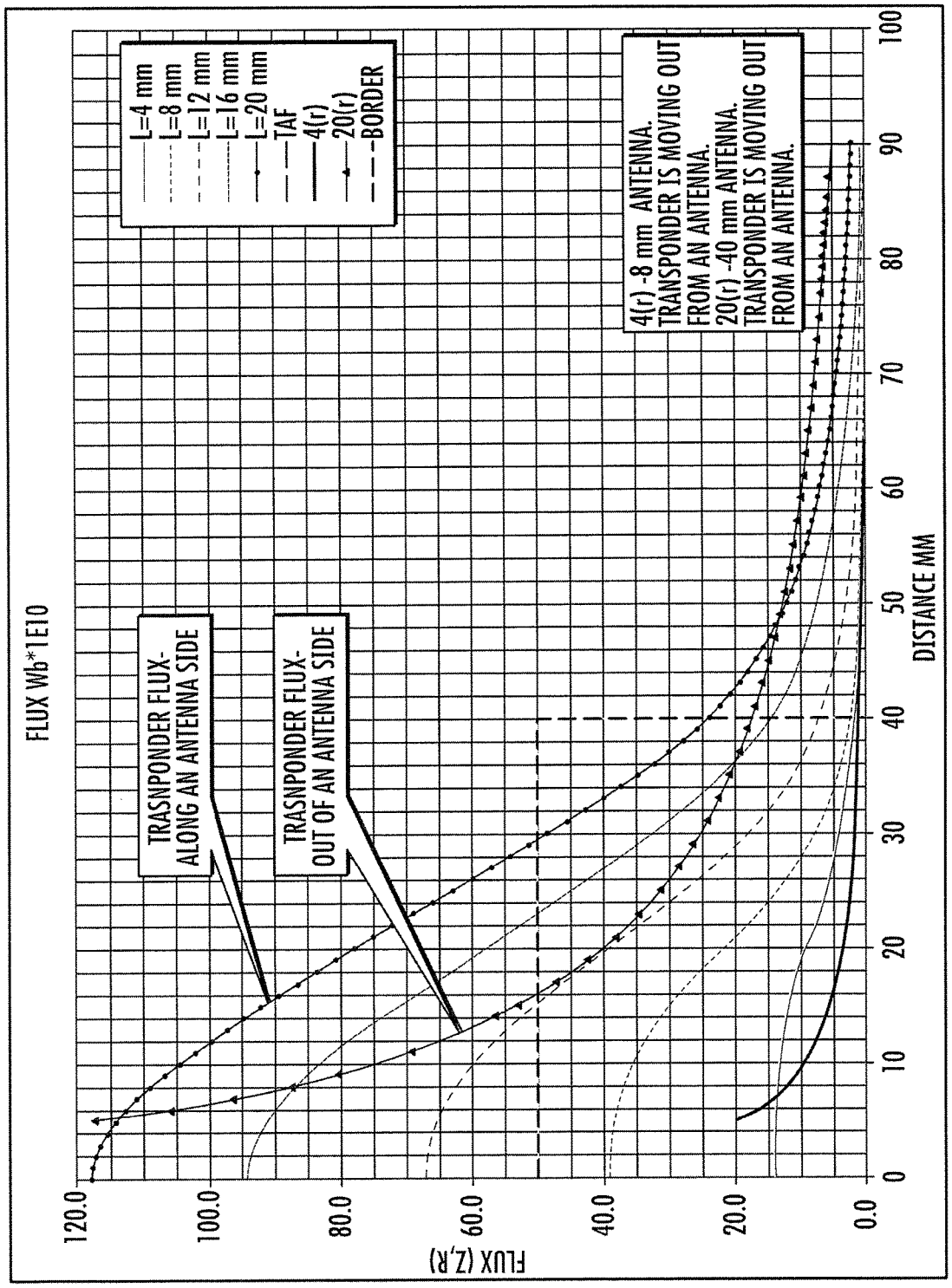
FIG. 14 illustrates a magnetic flux distribution comparison for two antennas to transponder alignments.

Magnetic flux, which may be collected, for example, by a square 40×40 mm HF transponder separated 5 mm from the antenna having 3 turns, may be calculated by using Biot-Savart Law end, an expression for magnetic flux density of a finite straight wire. FIG. 14 illustrates the results from such an example. Because a flux distribution curve is symmetrical regarding 0 "Distance" coordinate only one half of it is shown. An antenna occupies distance from 0 to 40 mm along a "Distance" coordinate. The magnetic flux curve has a single hump when transponder is aligned with an antenna and shows a considerable drop as soon as a transponder is moved to an adjacent position either on the left or right side (i.e., downstream or upstream) of the transponder encoding area. The chart in FIG. 14 also illustrates how much a magnetic flux (curve $20(r)$) via transponder changes if transponder starts moving from 0 mm shift along the antenna but 5 mm away from it and takes a direction along a perpendicular to a "Distance" axis. In this case magnetic flux through a transponder falls faster than when a transponder moves out along a "Distance" axis (curve L=20). Because a communication with a transponder is only possible while magnetic flux exceeds TAF, a communication range for the first antenna to transponder alignment is almost twice shorter than for the second antenna to transponder alignment. Outside the targeted encoding area, the magnetic flux for the second antenna to transponder alignment is even lower than for the first antenna to transponder alignment and, thus, the second antenna to transponder alignment has a higher spatial selectivity.

According to an exemplary embodiment, an RFID system for selectively communicating with a targeted transponder from among a group of multiple adjacent transponders is provided. The RFID system includes a transponder conveyance system and an antenna. The transponder conveyance system is configured to transport a targeted transponder from a group of multiple adjacent transponders through a transponder encoding area along a feed path in a feed direction. The antenna comprises a resonant inductor and a shielding element. The shielding element partially encloses the resonant inductor thereby defining an exposed portion of the resonant inductor and an enclosed portion of the resonant inductor. The exposed portion further defines a coupling portion of the resonant inductor that extends lengthwise in the feed direction for providing lateral movement as described above through the transponder encoding area of the targeted transponder relative to the antenna. As a more specific example, the longest dimension of the coupling portion may define the length of the antenna. Therefore, according to this embodiment, the coupling portion of the resonant inductor relative to its longest dimension is parallel to the feed direction. Such a spatial arrangement places the majority of the resonant coil (e.g., a wire or trace) transponder parallel to the feed direction and thus parallel to the closest side of the transponder's antennae.

The "coupling portion" is intended to distinguish portions of the resonant inductor that is unshielded but not oriented for coupling with the transponder. For example, in instances in which the resonant inductor is a rectangular loop. The loop may include a right side that extends parallel with the transponder. This right side is for coupling with the transponder and thus is referred to as a coupling portion. However, the rectangular loop also includes a front side and back side for connecting the coupling portion with the left side of the rectangular loop. A portion of the front side and back side of the loop may be unshielded. However, these unshielded portions are not used for coupling and thus are referred to as non-coupling portions.

In another embodiment, a system for processing a targeted transponder among at least an adjacent upstream transponder and an adjacent downstream transponder is provided. Each of the targeted transponder, upstream transponder, and downstream transponder define a length in a feed direction. The antenna defines a length extending in the feed direction that is approximately equal to or less than the length of each of the targeted transponder, the upstream transponder, and the downstream transponder. The antenna is configured to generate a magnetic field. Magnetic flux is a measure of strength of the magnetic filed over a particular area. According to this embodiment, the transponder conveyance system is configured to transport the downstream transponder, the targeted transponder, and the upstream transponder along a feed path to an interrogation position in which the targeted transponder and the antenna are substantially aligned lengthwise. In the interrogation position, at least a portion of the targeted transponder collects magnetic flux of the magnetic field capable of activating the targeted transponder and neither the upstream transponder nor the downstream transponder collects magnetic flux of the magnetic field capable of activation.

Examples of being substantially aligned lengthwise are illustrated in FIGS. 8 and 13. More specifically, as used herein, "aligned lengthwise" means that the center of the transponder and the center of the antenna are aligned relative to an "X" location (e.g., X=0 as illustrated in FIG. 8). The "X" location references a point along the feed path. To be aligned means that the centers are within a common first plane that is orthogonal to the lengths of the antenna and the transponder.

The inventive concepts described herein are not limited to the examples provided herein and may be applied to other RFID enabled systems that may benefit from the ability to selectively communicate with a targeted transponder disposed among multiple adjacent transponders close to the coupler.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system configured to communicate with a targeted transponder disposed between an upstream transponder and a downstream transponder, wherein the upstream transponder, the targeted transponder, and the downstream transponder are disposed on a web and movable along a feed path in a feed direction through a communication area, the system comprising:
a transponder conveyance system configured to transport the downstream transponder, the targeted transponder, and the upstream transponder via the web along the feed path to an interrogation position in which the targeted transponder and an antenna are substantially aligned lengthwise and the targeted transponder is within the communication area; and
the antenna configured to generate a magnetic field that is concentrated at the communication area such that, in the interrogation position, at least a portion of the targeted transponder collects magnetic flux of the magnetic field capable of activating the targeted transponder and neither the upstream transponder nor the downstream transponder collects magnetic flux of the magnetic field capable of activation, wherein:

the antenna defines:
an antenna length extending in the feed direction; and
an antenna plane extending along the antenna length;
the targeted transponder defines:
a transponder plane that is parallel to the web;
the antenna plane and the transponder plane are the same plane when the targeted transponder is positioned in the interrogation position.

2. The system of claim 1, wherein the antenna includes a resonant inductor and a shielding element that at least partially encloses the resonant inductor thereby defining an exposed portion of the resonant inductor and an enclosed portion of the resonant inductor, and wherein the exposed portion of the resonant inductor extends substantially parallel to the feed path.

3. The system of claim 2, wherein the resonant inductor includes a spiral coil on a printed circuit board.

4. The system of claim 2, wherein the shielding element includes a ferrite material.

5. The system of claim 1 further comprising:
a housing; and
a printhead configured to print indicia on media units including transponders.

6. The system of claim 5, wherein the printhead is positioned proximate to a media exit of the housing where the media units exit the housing.

7. The system of claim 6 further comprising a platen roller adjacent the media exit.

8. The system of claim 6, wherein the communication area overlaps with the interrogation position and is less than a length of a media unit from the media exit.

9. The system of claim 8, wherein the printhead is configured to print indicia on the media units within the communication area.

10. The system of claim 1, wherein the antenna length defines a longest dimension of a coupling portion of the antenna.

11. The method of claim 1, wherein the antenna length defines a longest dimension of a coupling portion of the antenna.

12. A method of encoding a targeted transponder disposed on a web between an upstream transponder and a downstream transponder, comprising:
moving the upstream transponder, the targeted transponder, and the downstream transponder via the web along a feed path in a feed direction through a communication area, where the targeted transponder defines a first plane when the targeted transponder is positioned in the communication area, the first plane being parallel to the web;
generating a magnetic field from an antenna that is concentrated at the communication area, wherein the antenna defines a second plane extending along an antenna length, the second plane the same as the first plane when the targeted transponder positioned in the communication area, the antenna length extending in the feed direction; and
transporting the downstream transponder, the targeted transponder, and the upstream transponder along the feed path to an interrogation position in which the targeted transponder and the antenna are substantially aligned lengthwise and the targeted transponder is within the communication area; and
activating the targeted transponder, when the targeted transponder is in the interrogation position, by causing at least a portion of the targeted transponder to collect magnetic flux of the magnetic field capable of activating the targeted transponder and neither the upstream transponder nor the downstream transponder collects magnetic flux of the magnetic field capable of activation.

13. The method of claim 12, wherein generating the magnetic field further comprises generating the magnetic field from the antenna that includes a resonant inductor and a shielding element that at least partially encloses the resonant inductor thereby defining an exposed portion of the resonant inductor and an enclosed portion of the resonant inductor, and wherein the exposed portion of the resonant inductor extends substantially parallel to the feed path.

14. The method of claim 12 further comprising printing indicia on media units including transponders.

15. The method of claim 14, wherein the printing is performed by a printhead positioned proximate to a media exit of a housing where the media units exit the housing.

16. The method of claim 15, wherein activating the targeted transponder occurs less than a length of a media unit from the media exit.

17. The method of claim 14, wherein the printing occurs within the communication area.

* * * * *